US010362112B2

(12) United States Patent
Ryhorchuk et al.

(10) Patent No.: US 10,362,112 B2
(45) Date of Patent: Jul. 23, 2019

(54) APPLICATION ENVIRONMENT FOR LIGHTING SENSORY NETWORKS

(71) Applicant: VERIZON PATENT AND LICENSING INC., Basking Ridge, NJ (US)

(72) Inventors: Kent W. Ryhorchuk, Portola Valley, CA (US); Christopher David Sachs, Sunnyvale, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 210 days.

(21) Appl. No.: 14/639,872

(22) Filed: Mar. 5, 2015

(65) Prior Publication Data
US 2015/0256623 A1  Sep. 10, 2015

Related U.S. Application Data

(60) Provisional application No. 61/948,856, filed on Mar. 6, 2014.

(51) Int. Cl.
*H04L 29/08* (2006.01)
*G06F 9/54* (2006.01)
(52) U.S. Cl.
CPC ............... *H04L 67/12* (2013.01); *G06F 9/54* (2013.01); *H04L 67/34* (2013.01); *H04L 67/32* (2013.01)
(58) Field of Classification Search
CPC .. G06F 8/61; G06F 8/65; G06Q 10/20; Y02B 20/72
See application file for complete search history.

(56) References Cited

U.S. PATENT DOCUMENTS

| 4,384,288 A | 5/1983 | Walton |
| 5,161,107 A | 11/1992 | Mayeaux et al. |
| 5,161,607 A | 11/1992 | Chao |
| 5,793,491 A | 8/1998 | Wangler et al. |
| 6,118,230 A | 9/2000 | Fleischmann |

(Continued)

FOREIGN PATENT DOCUMENTS

| CA | 2690148 A1 | 12/2008 |
| CN | 101370334 A | 2/2009 |

(Continued)

OTHER PUBLICATIONS

C. Intanagonwiwat, D. Estrin, R. Govindan, and J. Heidemann; Impact of network density on data aggregation in wireless sensor networks. Submitted for Publication, ICDCS-22, Nov. 2001. pp. 2 and 9.*

(Continued)

*Primary Examiner* — Oleg Survillo
*Assistant Examiner* — Christopher P Cadorna

(57) ABSTRACT

In various example embodiments, a system and method are provided for a service data platform. The service data platform includes an application management API configured to receive software uploaded by a third party using a management application API. The service data platform also includes a plurality of graph servers configured to identify a group of lighting nodes to distribute the uploaded software and determine the uploaded software is safe for deployment to the identified group of lighting nodes. The service data platform further includes a device manager configured to distribute, using an administrative API, the uploaded software to the identified group of lighting nodes.

10 Claims, 18 Drawing Sheets

(56) References Cited

U.S. PATENT DOCUMENTS

| | | | |
|---|---|---|---|
| 6,282,206 B1* | 8/2001 | Hindus | H04L 29/06 348/E7.081 |
| 6,364,253 B1 | 4/2002 | Cavanagh | |
| 6,608,453 B2 | 8/2003 | Morgan et al. | |
| 6,683,539 B2 | 1/2004 | Trajkovic et al. | |
| 6,696,945 B1 | 2/2004 | Venetianer et al. | |
| 6,961,313 B1 | 11/2005 | Gaspar | |
| 6,970,083 B2 | 11/2005 | Venetianer et al. | |
| 6,999,882 B2 | 2/2006 | Frie et al. | |
| 7,304,727 B2 | 12/2007 | Chien et al. | |
| 7,333,903 B2 | 2/2008 | Walters et al. | |
| 7,583,815 B2 | 9/2009 | Zhang et al. | |
| 7,613,324 B2 | 11/2009 | Venetianer et al. | |
| 7,613,590 B2 | 11/2009 | Brown | |
| 7,674,018 B2 | 3/2010 | Holder et al. | |
| 7,817,063 B2 | 10/2010 | Hawkins et al. | |
| 7,825,602 B2 | 11/2010 | Hu et al. | |
| 7,868,912 B2 | 1/2011 | Venetianer et al. | |
| 7,925,249 B2 | 4/2011 | Funk et al. | |
| 7,925,384 B2 | 4/2011 | Huizenga et al. | |
| 7,932,923 B2 | 4/2011 | Lipton et al. | |
| 7,983,685 B2 | 7/2011 | Silverstrim et al. | |
| 7,986,339 B2 | 7/2011 | Higgins | |
| 8,027,809 B2 | 9/2011 | Brown | |
| 8,049,592 B2 | 11/2011 | Wang et al. | |
| 8,073,554 B2 | 12/2011 | Vezza et al. | |
| 8,078,431 B2 | 12/2011 | Brown | |
| 8,095,340 B2 | 1/2012 | Brown | |
| 8,111,018 B2 | 2/2012 | You | |
| 8,147,267 B2 | 4/2012 | Oster | |
| 8,244,260 B2 | 8/2012 | Silverstrim et al. | |
| 8,285,986 B2 | 10/2012 | Shon et al. | |
| 8,306,051 B2 | 11/2012 | Stocker et al. | |
| 8,334,901 B1 | 12/2012 | Ganick et al. | |
| 8,334,906 B2 | 12/2012 | Lipton et al. | |
| 8,436,542 B2 | 5/2013 | Middleton-white et al. | |
| 8,438,175 B2 | 5/2013 | Papke et al. | |
| 8,441,397 B2 | 5/2013 | Binzer et al. | |
| 8,461,963 B2 | 6/2013 | Ko et al. | |
| 8,464,182 B2 | 6/2013 | Blumenberg et al. | |
| 8,493,209 B2 | 7/2013 | Mohan et al. | |
| 8,510,550 B2 | 8/2013 | Westhoff et al. | |
| 8,514,082 B2 | 8/2013 | Cova et al. | |
| 8,522,029 B2 | 8/2013 | Agrawal et al. | |
| 8,531,134 B2 | 9/2013 | Chemel et al. | |
| 8,532,962 B2 | 9/2013 | Zhang et al. | |
| 8,533,491 B2 | 9/2013 | Klein | |
| 8,542,130 B2 | 9/2013 | Lavoie | |
| 8,558,889 B2 | 10/2013 | Martin et al. | |
| 8,560,357 B2 | 10/2013 | Sickenius | |
| 8,564,661 B2 | 10/2013 | Lipton et al. | |
| 8,575,861 B1 | 11/2013 | Gordin et al. | |
| 8,582,816 B2 | 11/2013 | Lee et al. | |
| 8,587,225 B2 | 11/2013 | Ashar et al. | |
| 8,590,011 B1 | 11/2013 | Legault | |
| 8,594,482 B2 | 11/2013 | Fan et al. | |
| 8,607,341 B2 | 12/2013 | Yoon et al. | |
| 8,619,079 B2 | 12/2013 | Peterson et al. | |
| 8,619,549 B2 | 12/2013 | Narayana et al. | |
| 8,635,049 B2 | 1/2014 | Kauffman et al. | |
| 8,732,031 B2 | 5/2014 | Martin et al. | |
| 8,880,199 B2 | 11/2014 | Wei et al. | |
| 8,994,276 B2 | 3/2015 | Recker et al. | |
| 9,374,870 B2 | 6/2016 | Cumpston et al. | |
| 2002/0195975 A1 | 12/2002 | Schanberger et al. | |
| 2003/0102979 A1 | 6/2003 | Jednacz et al. | |
| 2003/0222587 A1 | 12/2003 | Dowling, Jr. et al. | |
| 2004/0124338 A1 | 7/2004 | Cloutier et al. | |
| 2005/0285547 A1 | 12/2005 | Piepgras et al. | |
| 2007/0234036 A1 | 10/2007 | Tan et al. | |
| 2007/0294393 A1 | 12/2007 | Smith et al. | |
| 2008/0215391 A1 | 9/2008 | Dowling et al. | |
| 2008/0313282 A1* | 12/2008 | Warila | G06F 8/24 709/206 |
| 2009/0026966 A1 | 1/2009 | Budde et al. | |
| 2009/0066540 A1 | 3/2009 | Marinakis et al. | |
| 2009/0218951 A1 | 9/2009 | Weaver | |
| 2009/0262189 A1 | 10/2009 | Marman | |
| 2009/0278479 A1 | 11/2009 | Platner et al. | |
| 2009/0299527 A1 | 12/2009 | Huizenga et al. | |
| 2009/0307255 A1 | 12/2009 | Park | |
| 2010/0001652 A1 | 1/2010 | Damsleth | |
| 2010/0122257 A1* | 5/2010 | Wada | G06F 9/485 718/102 |
| 2010/0204847 A1 | 8/2010 | Leete, III et al. | |
| 2010/0228601 A1 | 9/2010 | Vaswani et al. | |
| 2011/0002324 A1 | 1/2011 | Falck et al. | |
| 2011/0066297 A1 | 3/2011 | Saberi et al. | |
| 2011/0133655 A1 | 6/2011 | Recker et al. | |
| 2011/0158410 A1 | 6/2011 | Falk et al. | |
| 2011/0199004 A1 | 8/2011 | Henig et al. | |
| 2011/0299455 A1 | 12/2011 | Ordentlich et al. | |
| 2011/0309756 A1 | 12/2011 | Chao | |
| 2012/0002406 A1 | 1/2012 | Leadford et al. | |
| 2012/0038281 A1 | 2/2012 | Verfuerth | |
| 2012/0040606 A1 | 2/2012 | Verfuerth | |
| 2012/0043889 A1 | 2/2012 | Recker et al. | |
| 2012/0062123 A1 | 3/2012 | Jarrell et al. | |
| 2012/0068608 A1 | 3/2012 | Covaro et al. | |
| 2012/0086561 A1 | 4/2012 | Ilyes et al. | |
| 2012/0130544 A1 | 5/2012 | Mohan et al. | |
| 2012/0130774 A1 | 5/2012 | Ziv et al. | |
| 2012/0143357 A1 | 6/2012 | Chemel et al. | |
| 2012/0146518 A1 | 6/2012 | Keating et al. | |
| 2012/0191770 A1 | 7/2012 | Perlmutter et al. | |
| 2012/0262093 A1 | 10/2012 | Recker et al. | |
| 2012/0307069 A1 | 12/2012 | Pierce | |
| 2012/0310984 A1 | 12/2012 | Branson et al. | |
| 2013/0010251 A1 | 1/2013 | Croft et al. | |
| 2013/0013091 A1 | 1/2013 | Cavalcanti et al. | |
| 2013/0038490 A1* | 2/2013 | Garcia | G01S 1/68 342/451 |
| 2013/0073192 A1 | 3/2013 | Hota et al. | |
| 2013/0088168 A1 | 4/2013 | Mohan et al. | |
| 2013/0107041 A1 | 5/2013 | Norem et al. | |
| 2013/0134886 A1 | 5/2013 | Golding et al. | |
| 2013/0144564 A1 | 6/2013 | Devaul et al. | |
| 2013/0158952 A1 | 6/2013 | Liebel et al. | |
| 2013/0159454 A1 | 6/2013 | Hunter et al. | |
| 2013/0211613 A1 | 8/2013 | Praske et al. | |
| 2013/0221203 A1 | 8/2013 | Barrilleaux | |
| 2013/0227569 A1 | 8/2013 | Kohli et al. | |
| 2013/0229804 A1 | 9/2013 | Holder et al. | |
| 2013/0265563 A1 | 10/2013 | Vogt et al. | |
| 2013/0297212 A1 | 11/2013 | Ramer et al. | |
| 2013/0304587 A1* | 11/2013 | Ralston | G06Q 30/0271 705/14.67 |
| 2013/0342355 A1 | 12/2013 | Lund et al. | |
| 2013/0346229 A1* | 12/2013 | Martin | G06Q 40/00 705/26.3 |
| 2014/0001963 A1* | 1/2014 | Chobot | H05B 37/02 315/153 |
| 2014/0023096 A1* | 1/2014 | Czompo | H04J 3/025 370/537 |
| 2014/0028199 A1 | 1/2014 | Chemel | |
| 2014/0084795 A1 | 3/2014 | Cumpston et al. | |
| 2014/0289323 A1* | 9/2014 | Kutaragi | G06Q 50/01 709/203 |
| 2014/0358734 A1* | 12/2014 | Sehgal | G06F 8/654 705/27.1 |
| 2015/0007315 A1* | 1/2015 | Rivera | G06F 21/51 726/23 |
| 2015/0169871 A1* | 6/2015 | Achutha | G06F 21/6218 726/1 |
| 2016/0205115 A1* | 7/2016 | Kulkarni | G06F 21/568 726/1 |
| 2016/0366753 A1 | 12/2016 | Cumpston et al. | |

FOREIGN PATENT DOCUMENTS

| | | |
|---|---|---|
| CN | 102291872 A | 12/2011 |
| CN | 102387635 A | 3/2012 |
| CN | 102610137 A | 7/2012 |

(56) References Cited

FOREIGN PATENT DOCUMENTS

| | | | |
|---|---|---|---|
| CN | 102110376 | B | 11/2012 |
| CN | 102867386 | A | 1/2013 |
| CN | 20293979 | U | 5/2013 |
| CN | 103687200 | A | 3/2014 |
| EP | 1658579 | A1 | 5/2006 |
| EP | 2581888 | A1 | 4/2013 |
| EP | 2660625 | A1 | 11/2013 |
| EP | 2709428 | A2 | 3/2014 |
| JP | 2014064274 | A | 4/2014 |
| KR | 1020070044243 | A | 4/2007 |
| KR | 100760535 | B1 | 9/2007 |
| KR | 100784836 | B1 | 12/2007 |
| KR | 20100136186 | A | 12/2010 |
| KR | 20110017037 | A | 2/2011 |
| KR | 20110055807 | A | 5/2011 |
| KR | 20150089983 | A | 8/2015 |
| WO | WO-2003055734 | A1 | 7/2003 |
| WO | WO-2008008505 | A2 | 1/2008 |
| WO | WO-2008085815 | A1 | 7/2008 |
| WO | WO-2009076182 | A1 | 6/2009 |
| WO | WO-2011041903 | A1 | 4/2011 |
| WO | WO-2011053969 | A2 | 5/2011 |
| WO | WO-2011055261 | A1 | 5/2011 |
| WO | WO-2011121470 | A1 | 10/2011 |
| WO | WO-2011132013 | A1 | 10/2011 |
| WO | WO-2012042432 | A1 | 4/2012 |
| WO | WO-2012092150 | A2 | 7/2012 |
| WO | WO-2012140152 | A1 | 10/2012 |
| WO | WO-2013131189 | A1 | 9/2013 |
| WO | WO-2013165777 | A1 | 11/2013 |
| WO | WO-2015134937 | A1 | 9/2015 |

OTHER PUBLICATIONS http://miun.diva-portal.org/smash/get/diva2:281643/FULLTEXT01.pdf, Qinghua Wang, Traffic Analysis, Modeling and Their Applications in Energy-Constrained Wireless Sensor Networks, 2010, Mid Sweden University, p. 25-26 "In-Network Processing".*

"U.S. Appl. No. 14/024,561, Non Final Office Action dated Jul. 22, 2015", 12 pgs.

"U.S. Appl. No. 14/024,561, Notice of Allowance dated Feb. 19, 2016", 5 pgs.

"U.S. Appl. No. 14/024,561, Notice of Allowance dated Nov. 25, 2015", 5 pgs.

"U.S. Appl. No. 14/024,561, Response filed Oct. 21, 2015 to Non Final Office Action dated Jul. 22, 2015", 13 pgs.

"European Application Serial No. 13184124.9, Communication Pursuant to EPC Rule 69 dated Jul. 13, 2015", 2 pgs.

"European Application Serial No. 13184124.9, Extended European Search Report dated Jul. 5, 2015", 9 pgs.

"European Application Serial No. 13184124.9, Response filed Jan. 8, 2016 to Extended European Search Report dated Jun. 5, 2015", 22 pgs.

"International Application Serial No. PCT/US2015/019296, International Preliminary Report on Patentability mailed", 9 pgs.

"Korean Application Serial No. 2013-0109844, Response filed Oct. 14, 2014 to Office Action dated Jul. 24, 2014", W/ English Claims.

"Korean Application Serial No. 2013109844, Response filed Mar. 30, 2015 to Office Action dated Feb. 26, 2015", W/ English Claims, 20 pgs.

"U.S. Appl. No. 14/224,300, Non Final Office Action dated Jul. 8, 2014", 24 pgs.

"International Application Serial No. PCT/US2013/037968, International Search Report dated Jul. 2, 2013", 2 pgs.

"International Application Serial No. PCT/US2013/045407, International Search Report dated Sep. 23, 2013", 8 pgs.

"International Application Serial No. PCT/US2014/031723, International Search Report dated Jul. 7, 2014", 3 pgs.

"International Application Serial No. PCT/US2015/019296, International Search Report dated Jun. 1, 2015", 3 pgs.

"International Application Serial No. PCT/US2015/019296, Written Opinion dated Jun. 1, 2015", 8 pgs.

"Korean Application Serial No. 2013-0109844, Office Action dated Jul. 24, 2014", W/ English Translation, 12 pgs.

"Korean Application Serial No. 2013-109844, Final Rejection After Reexamination dated Apr. 14, 2015", W/ English Translation, 6 pgs.

"Korean Application Serial No. 2013109844, Office Action dated Feb. 26, 2015", 6 pgs.

Munoz, D, et al., "", Position Location Techniques and Applications, Academic Press, (2009), 297 pgs.

Xu, J, et al., "Distance Measurement Model Based on RSSI in WSN", Wireless Sensor Network, (2010), 606-611.

"U.S. Appl. No. 15/185,329, Non Final Office Action dated Dec. 5, 2016", 8 pgs.

"U.S. Appl. No. 15/185,329, Notice of Allowance dated Mar. 16, 2017", 5 pgs.

"U.S. Appl. No. 15/185,329, Response filed Jan. 23, 2017 to Non Final Office Action dated Dec. 5, 2016", 14 pgs.

"Chinese Application Serial No. 201310552437.1, Office Action dated Jan. 4, 2017", w/English Claims, 14 pgs.

* cited by examiner

APPLICATION ENVIRONMENT FOR LIGHTING SENSORY NETWORKS

RELATED APPLICATIONS

This application claims the priority benefit of U.S. Provisional Application No. 61/948,856, entitled "A" filed Mar. 6, 2014, which is hereby incorporated by reference in its entirety.

The provisional application is related to U.S. Non-Provisional patent application Ser. No. 14/024,561, entitled "Networked Lighting Infrastructure for Sensing Applications," filed Sep. 11, 2013 and its related U.S. Provisional Application No. 61/699,968, filed Sep. 12, 2012.

TECHNICAL FIELD

Embodiments of the present disclosure relate generally to processing sensor data, and, more particularly, but not by way of limitation, to processing sensor data at sensor nodes within a network.

BACKGROUND

Today, sensor networks are being used in a wide range of application areas. For example, data collected by sensor networks may be used for environmental monitoring, security and surveillance, logistics and transportation, control and automation, and traffic monitoring. Sensor networks include sensor nodes that communicate over a network to a central server. This enables the sensor to be stored and processed by devices with more resources. Some types of sensors generate large amounts of sensor data (without altering the data) which may be difficult to transport to the central server or platform that processes sensor data for use by software applications.

BRIEF DESCRIPTION OF THE DRAWINGS

The various embodiments are illustrated by way of example, and not by way of limitation, in the figures of the accompanying drawings in which.

Figure 1A:
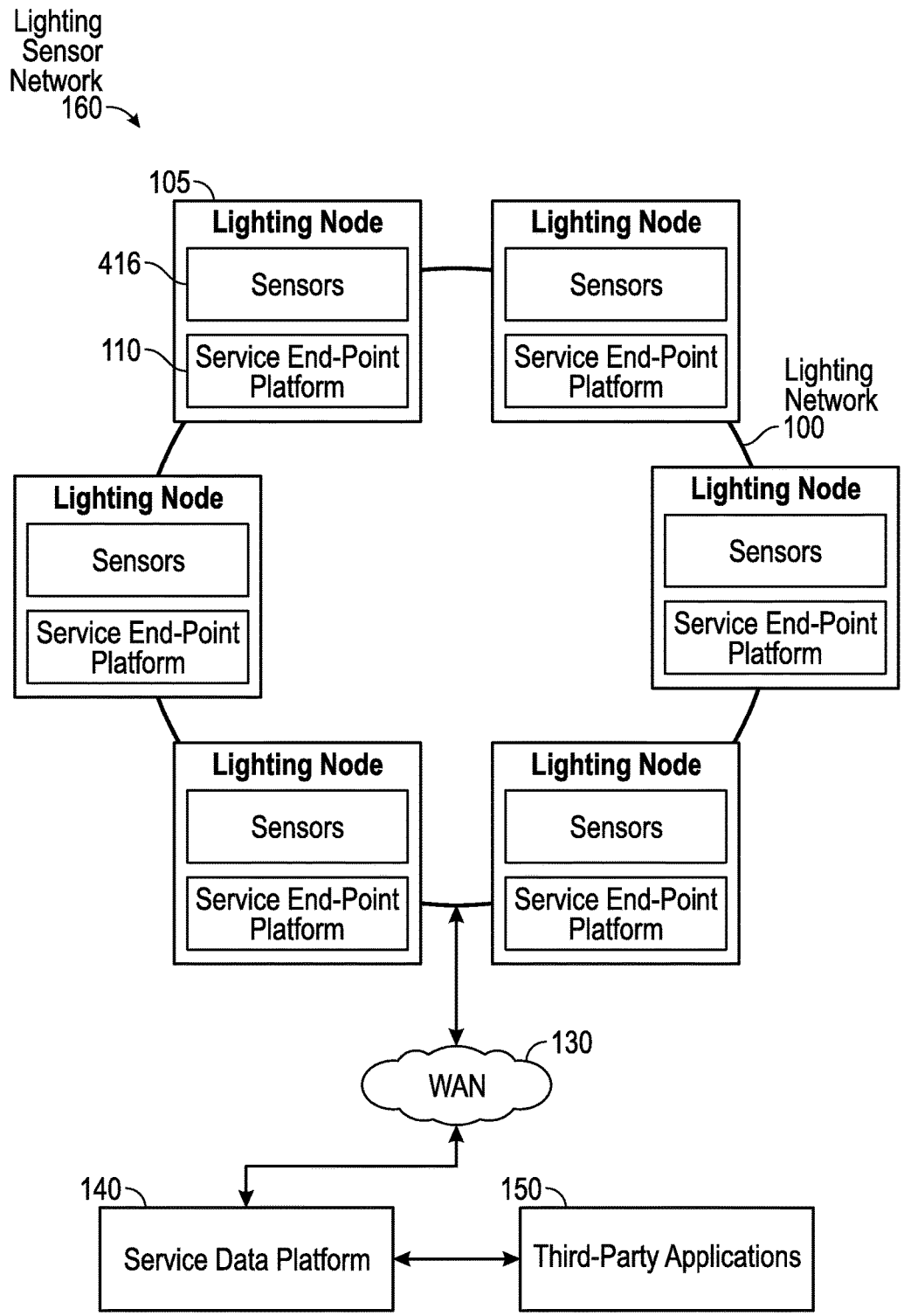
FIG. 1A is a diagram of a lighting sensor network suitable for use in various embodiments.

The headings provided herein are merely for convenience and do not necessarily affect the scope or meaning of the terms used.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

In a lighting sensor network, sensor data is collected at end-points within lighting nodes (referred to as service end-point platforms) and forwards the sensor data (e.g., the processed sensor data and raw sensor data) to a central server (referred to a service data platform) that collects and stores the node-based processed sensor data and the raw sensor data. The central server may also process the sensor data and provide access to the sensor data or applications utilizing the sensor data. Various embodiments, described below, enable the execution of third party software applications at the lighting nodes (or other nodes). The third party software applications may be used to customize the data results at the end-points of the lighting sensor network utilizing application specific heuristics.

Various embodiments of the lighting sensor network described in this specification offer many of the following features: providing a secure application execution environment for third party software applications at lighting nodes; providing node-based sensor data to the third party software applications while managing data security and privacy at the lighting nodes; providing site-based sensor data to the third party applications while managing data security and privacy; providing support for the administrative functions of the third party application software using a programmatic interface; managing data communications between the third party software application scripts and the third party applications uploaded to the service data platform in the cloud; managing the deployment of the third party application software to the lighting nodes; and managing the co-existence of multiple third party software applications on an end-point (e.g., service end-point platform).

Various techniques are disclosed that enable third parties (e.g., application developers, etc.) to access sensor data (including raw sensor data and sensor data events) and execute third party software on lighting nodes within lighting sensor networks. The third party software executed may include applications, scripts, routines, programs etc.

Third party application developers may be enabled to generate rule sets for generating heuristics or other analyses of particular types of sensor data collected at various lighting nodes within the lighting sensor network. Examples of sensor data include motion detection data, ambient light sensor data, audio data, image data, video data, and accelerometer data.

With access to the lowest level of sensor data available at lighting nodes (e.g., sensor data that has not been filtered, aggregated or otherwise changed by various devices within the light sensor network), third parties may develop third party software that utilizes this lowest level of sensor data for various purposes.

In various embodiments, the lighting nodes may be configured to execute third party software in an operating environment in which the various applications may not affect one another or the regular operations of the lighting nodes. In other words, the lighting nodes may provide a sandbox for safely allowing third party software to execute without affecting the lighting node output or operations.

In some embodiments, computing devices within a service data platform (e.g., cloud servers, etc.) may be configured to receive third party software targeted for deployment at the lighting nodes. The computing devices within the service data platform may scan, parse, debug, process, and/or otherwise analyze the third party software to identity issues or potentially hazardous content prior to distributing the software to the various lighting nodes for execution. For example, the third party software may be identified as potential malware or otherwise capable of generating network attacks or equipment shutdowns.

The lighting sensor network may provide an application scripting environment where third parties may access detailed sensor data collected from lighting nodes and perform node-based processing of detailed sensor data without adding undue congestion to the lighting network. Further, third parties may provide third party software (e.g., scripts) that may be customized to provide information relevant or desired by different entities or pursuits.

In various embodiments, the lighting network (including the lighting nodes) may be based at a customer site. The customer may authorize a third party to access and process the raw sensor data at the lighting nodes within the lighting network located at the customer site, with or without a fee. One example may be a parking garage service company that wants access to the raw sensor data at the lighting nodes within a parking garage at customer site. The parking garage customer site authorizes the parking garage service company to deploy a third party software application at the lighting nodes located at the customer parking garage site, and then access and process the raw sensor data by executing the third party software application at the lighting nodes located at the parking garage customer site.

The deployment of the third party software application and accessing the node-based processed sensor data is through the service data platform residing within a cloud computing environment in example embodiments. The various embodiments provide methods, devices, systems, and non-transitory process-readable storage media for an application scripting environment utilized within a lighting sensor network.

Examples of such lighting sensor networks are described within U.S. Non-Provisional patent application Ser. No. 14/024,561, entitled "Networked Lighting Infrastructure for Sensing Applications," filed Sep. 11, 2013 and its related U.S. Provisional Application No. 61/699,968, filed Sep. 12, 2012, the contents of which are incorporated by reference in its entirety.

The NetSense light sensor network platform developed by Sensity Systems Inc. of Sunnyvale Calif. provides an example of a lighting sensor network that may be used to implement various embodiments described. The NetSense framework enables deployment of a variety of sensors using a lighting infrastructure that allows applications to access sensor data at the nodes.

FIG. 1A illustrates an implementation of a light sensory network 160 suitable for use in various embodiments. The lighting sensor network 160 enables deployment of a variety of sensors using a lighting infrastructure and allows applications running on lighting nodes associated with the lighting infrastructure to securely access sensor data for processing.

FIG. 1A shows the various components of the lighting sensor network 160. The lighting sensor network 160 represents a lighting infrastructure that is networked with a service data platform 140. The lighting nodes 105, which include sensors 416 and a service end-point platform 110, according to one embodiment, may communicate over the network, such as a wide area network (WAN) 130 to communicate with the service data platform 140, which may reside in a cloud computing environment.

Lighting fixtures are included within a lighting infrastructure. The lighting infrastructure may be referred to as or located at a customer site. In various embodiments, the service data platform 140 may be owned and operated by an entity (e.g., Sensity Systems Inc.) and the owner of the lighting infrastructure may by a customer of the entity. A service end-point platform 110 may be installed at each lighting fixture. In alternative embodiments, only some of the lighting fixtures within a lighting infrastructure include the service end-point platform 110. The service end-point platform 110 may provide the functionality described below.

The service end-point platform 110 includes networking capabilities that connects lighting fixtures (within a lighting infrastructure) with the service data platform 140 in the cloud and supports communication between lighting fixtures or the lighting nodes 105. The service end-point platform 110 provides a compute platform for managing the communications, sensor data and processing at the lighting nodes 105. The service end-point platform 110 further provides a sensor interface that allows sensors 416 to be connected to the service end-point platform 110 within lighting nodes 105.

The service data platform 140 provides the functionality described below. The service data platform 140 represents centralized servers in the cloud, in example embodiments, that communicate with the lighting nodes 105 having service end-point platforms 110. Sensor data provided by the lighting nodes 105 are collected and stored in the service data platform 140. The sensor data provided by the lighting nodes 105 may have some processing performed at the lighting nodes 105 by one or more of the sensor applications 120. In particular, sensor data received at the lighting nodes 105 at a high bandwidth rate where it may be difficult to transmit such large amounts of raw sensor data over a network (e.g., the WAN 130), may be processed at the lighting nodes 105. The results of the node-based processed sensor data may then be transmitted over the WAN 130 to the service data platform 140, where the node-based processed sensor data is collected and stored, and may be accessed by authorized users or applications.

The service data platform 140 may process the sensor data provided by the lighting nodes 105. The sensor data processed by the service data platform 140 includes node-processed sensor data and sensor data that was not processed by the lighting nodes 105. In some examples, the data received by the service data platform 140 may include compressed data or other forms of altered raw sensor data. The sensor data received by the service data platform 140 may also be processed by the service data platform 140. In various embodiments, the processing of the service data platform 140 may include performing analytics on the sensor data by analytic servers 266 shown in FIG. 2B which accesses the sensor data from databases 291 through the database servers 290.

The service data platform 140 also provides both programmatic access thru API servers and web access thru web servers to data stored in the service data platform 140. For example, the service data platform 140 may provide the aggregate data API 141 for third party applications to access sensor data stored in the service data platform 140. In another example, the service data platform 140 may also provide access to the sensor data via web servers 280. The service data platform 140 may also provide the application management API 142 to upload applications to be deployed at the lighting nodes 105. The aggregate data API 141 and the application management API 142 are shown in FIG. 1B.

Figure 1B:
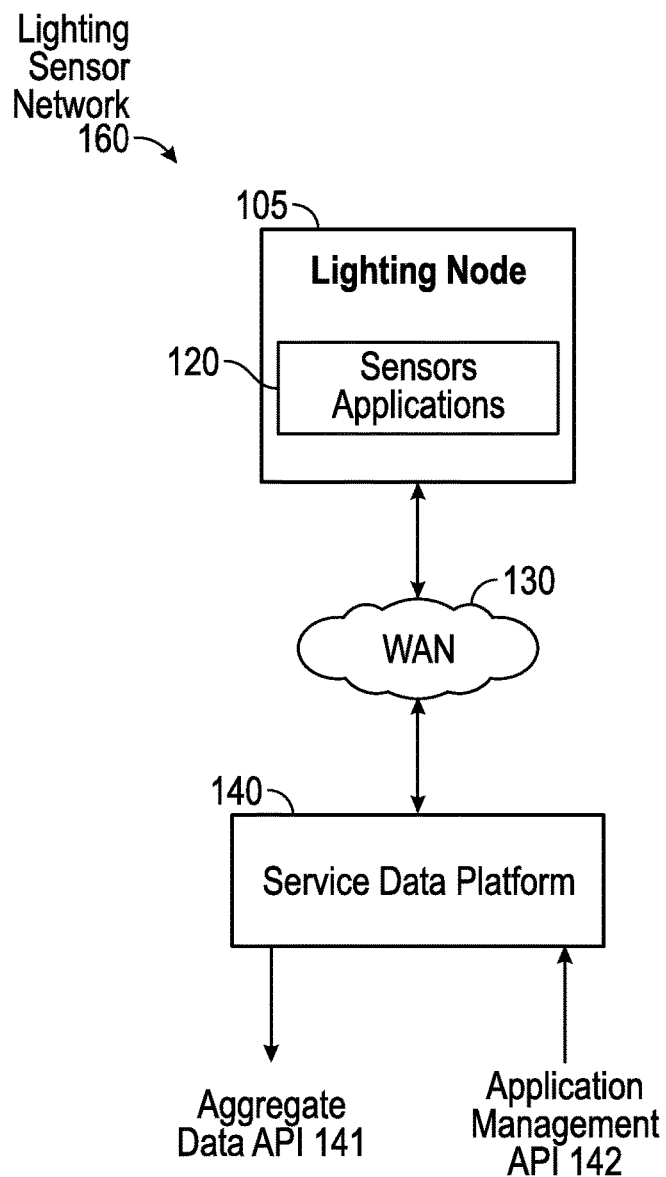
FIG. 1B illustrates a block diagram of lightings nodes in communication with a service data platform, according to example embodiments.

FIG. 1B illustrates a high level block diagram illustrating a lighting sensor network 160, according to an example embodiment. The lighting sensor network 160 may include lighting nodes 105 in communication with the service data platform 140. In example embodiments, each of the service end-point platforms 110 (shown in FIG. 1A) in the lighting nodes 105 may execute one or more sensor applications 120 deployed by the service data platform 140 for node-based sensor processing. The node-based sensor processing is generally used to perform analytics on sensor data available at the lighting nodes 105, and is particularly suitable for sensors that provide high bandwidth data that is not easily transmitted over the network without compression or other modifications to the sensor data.

The sensor applications 120 running on the lighting nodes 105 may be developed by third parties who would like to access sensor data and perform analytics on the sensor data available from the lighting sensor network 160, in particular sensor data available for analytics processing at the lighting nodes 105. The results of the analytics processing at the lighting nodes 105 are transmitted over the WAN 130 to the service data platform 140 for storage.

More than one sensor application 120 may be executed on each of the lighting nodes 105. In various embodiments, the sensor applications 120 may be implemented using a scripting language. Each sensor application 120 on a lighting node 105 is executed within a separate container to create a secure operating environment for each of the sensor applications 120. In various embodiments, the execution of one of the sensor applications 120 does not interfere with the operation of the other sensor applications 120 running at a lighting node 105, and also does not interfere or impede with the normal operations of the lighting nodes 105 or any lighting fixture associated with the lighting node 105. Each of the sensor applications 120 may be executed in a sandbox to provide a secure environment for the sensor applications 120 to be executed at the lighting nodes 105.

Figure 3A:
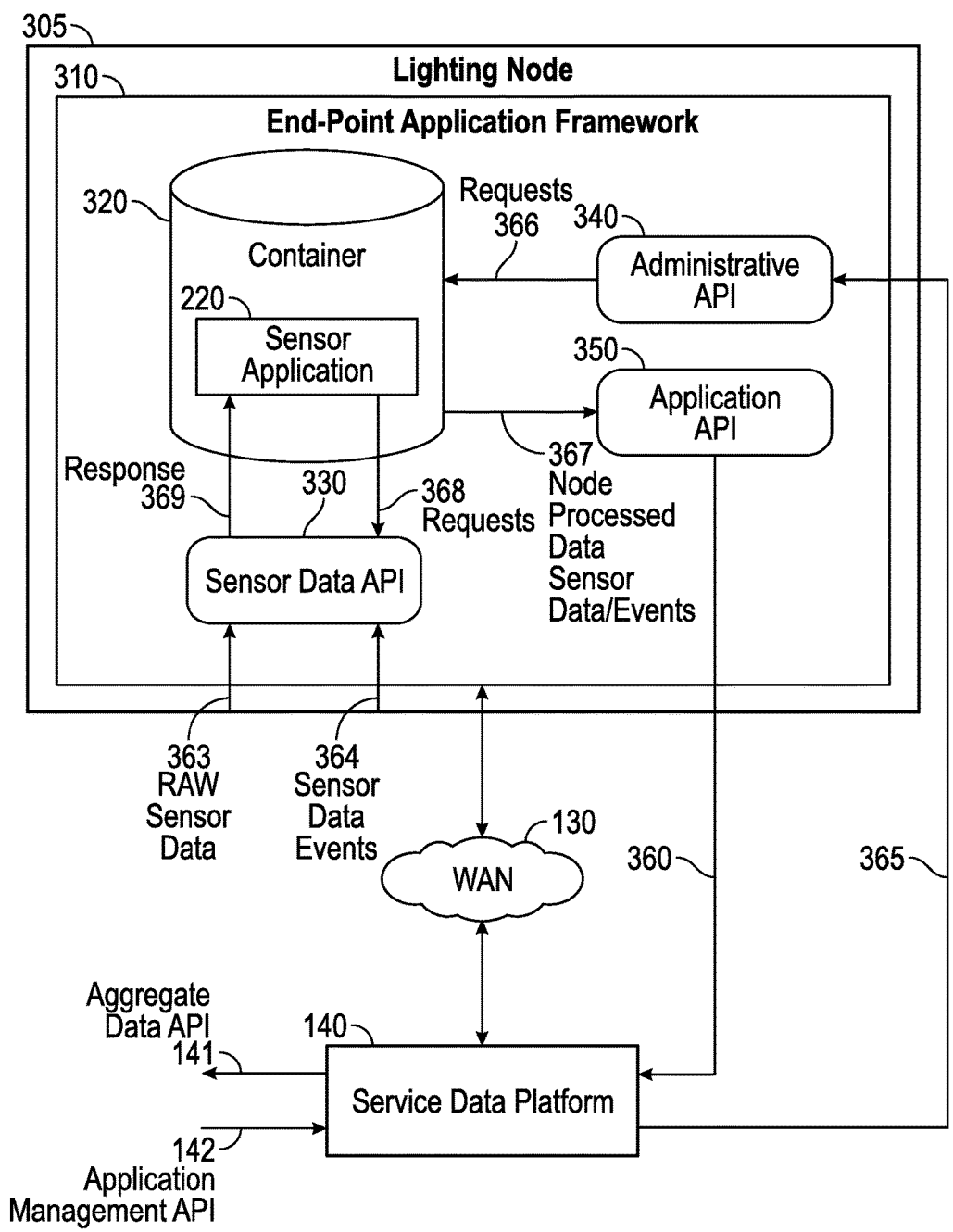
FIG. 3A illustrates a diagram of an exemplary software architecture that enables an end-point application framework to communicate with a service data platform to process sensor data at lighting nodes, according to example embodiments.
Figure 3B:
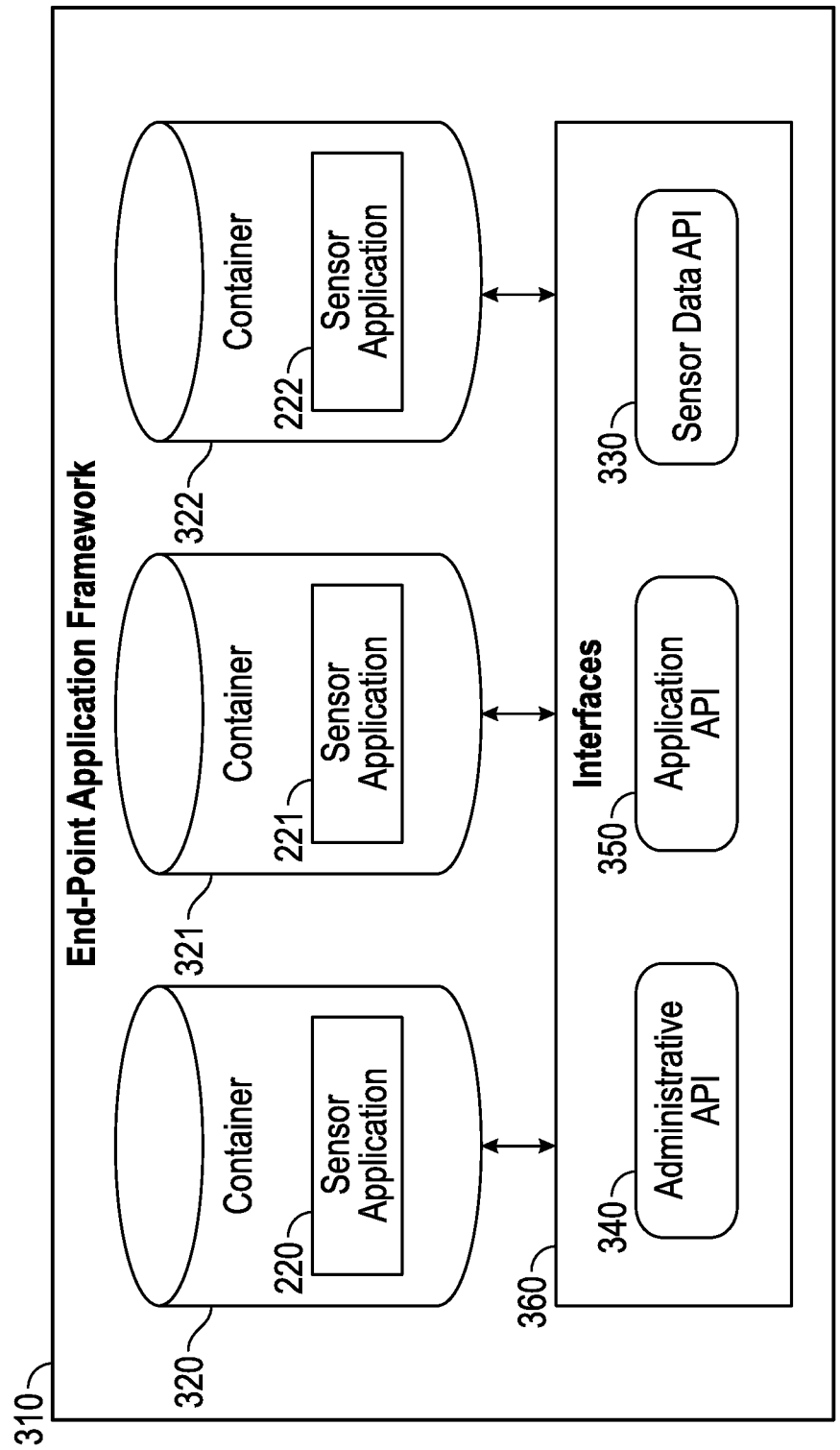
FIG. 3B illustrates a diagram of an end-point application framework with multiple containers according to an example embodiment.

Referring to FIG. 3B, the end-point application framework 310 includes multiple sensor applications 220-222 within separate containers 320-322, respectively, according to an embodiment. The sensor applications 220-222 may represent sensor applications 120. The container 320 manages the resources for running the sensor applications, which may respectively be implemented using a scripting language sometimes referred to as an application script. For example, the containers may be used to define limits for their associated sensor applications related to resources such as the central processing unit (CPU), memory, access to data and files, and prevent bad code from breaking sensor applications in other containers. In example embodiments, each application script runs in a separate application container (e.g., container 320). The sensor applications 220-222 represent application script or other software program executable within the end-point application framework 310. Also shown in FIG. 3B are the interfaces 360, which may be used to provide the administrative API 340, the application API 350 and the sensor data API 330.

The end-point application framework 310 provides a framework for executing sensor applications 220-222 or other software programs that provide node-based processing of sensor data by managing the containers 320-322 and interfaces 360. In various embodiments, lighting nodes 105 may be configured to execute various third-party software in an operating environment in which the various applications may not affect one another or the regular operations of the lighting nodes 105. In other words, the lighting nodes 105 may provide a sandbox for safely allowing third-party software to execute without affecting the output of the lighting nodes 105 or operation of the lighting nodes 105.

Referring back to FIG. 1B, the lighting nodes 105 are included within the lighting network 100. The lighting network 100 may include lighting fixtures. A lighting node 105 may be connected directly or indirectly to a lighting fixture. In example embodiments, some lighting nodes 105 may not directly connected or associated with a lighting fixture. In other embodiments, the lighting nodes 105 within a lighting network 100 may communicate among each other to transmit the sensor data from one lighting node 105 to another lighting node 105 for node-based processing of sensor data and transmission to the WAN 130. In further embodiments, some or all of the lighting nodes 105 may provide node-based processing of sensor data by sensor applications 120.

The lighting nodes 105 may be associated with the lighting fixtures by being directly or indirectly attached to the lighting fixtures, or may be connected remotely the lighting fixtures. In various embodiments, some of the lighting nodes 105 may not be associated with a lighting fixture and may communicate through other lighting nodes 105. In alternative embodiments, an infrastructure that includes fixtures without lights may be used, provided the infrastructure can supply the nodes (that receive sensor data) with power and networking capabilities. For example, the infrastructure may be a utility infrastructure with utility poles or an air conditioning infrastructure with air conditioning units. In these examples, nodes may be attached (directly or indirectly) to the utility poles or air conditioning units. In various embodiments, the lighting nodes 105 represent sensor nodes that are not associated with a light fixture or light sensor.

As shown in FIG. 1B, the service data platform 140 provides a platform for sensor applications to be uploaded to the service data platform 140, using an application management API 142. The application management API 142 provides an API for third parties to upload sensor applications 120 onto the service data platform 140. The APIs provided by the service data platform 140 may be a general API or custom API.

The service data platform 140 includes a deployment module (e.g., deployment module 520 shown in FIG. 5B) which provides functionality to deploy the sensor applications 120 to the various lighting nodes 105. The deployment module 520, alone or in combination with a node management module (e.g., node management module 540 shown in FIG. 5B) determines which lighting nodes 105 within which lighting networks 100 to deploy which of the sensor applications 120. One or more of the sensor applications 120 may be deployed at each of the lighting nodes 105.

In various embodiments, prior to the deployment by the service data platform 140 of a sensor application 120, the service data platform 140 evaluates or screens the sensor application 120 to determine the sensor application 120 is not likely to cause harm to the lighting node 105 when executed or deployed on the lighting node 105.

FIG. 1B also shows an aggregate data API 141 for users or applications to access sensor data (node-based processed sensor data or server-based processed sensor data). The server-based processing of sensor data may be performed by the analytics servers 266 shown in FIG. 2B. As discussed above the node-based processing of sensor data is performed by the sensors applications 120 running on the lighting nodes 105. In various embodiments, the sensor data may be accessed using the aggregate data API 141.

Figure 2A:
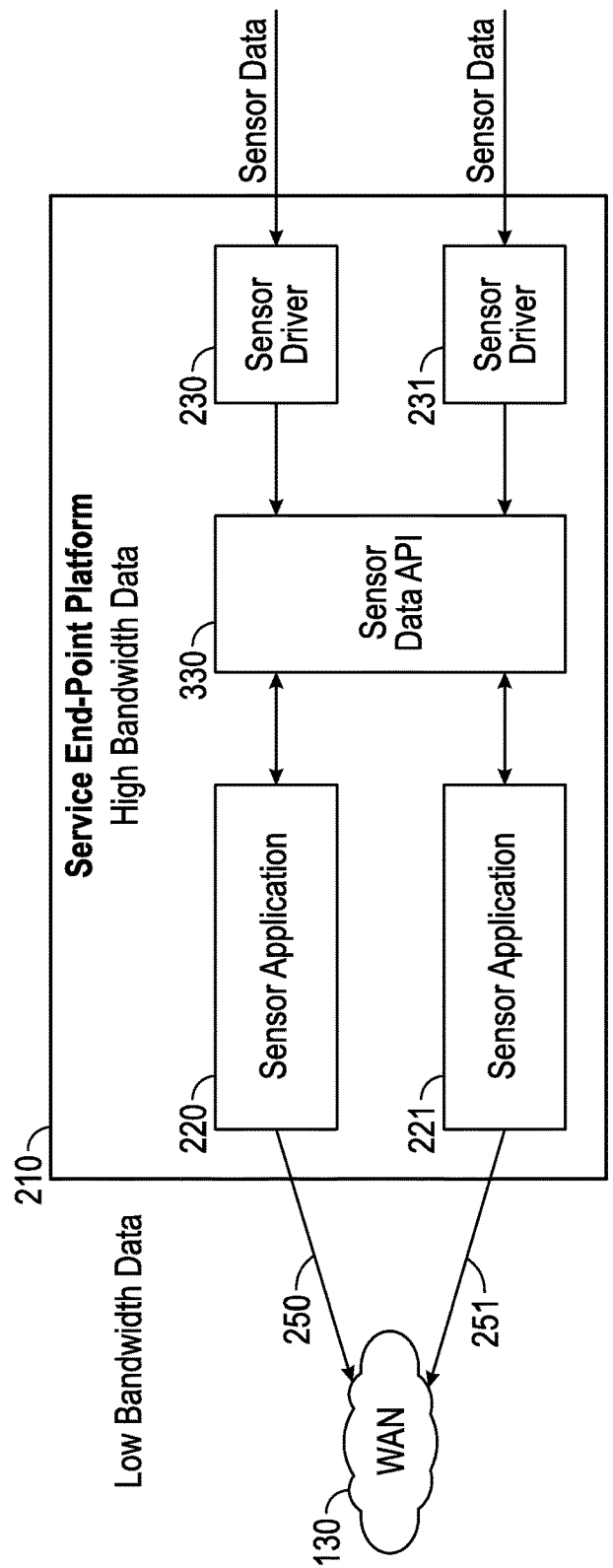
FIG. 2A illustrates a diagram of a service end-point platform that receives high bandwidth data from sensors and provides low bandwidth data to a network, according to example embodiments.
Figure 2B:
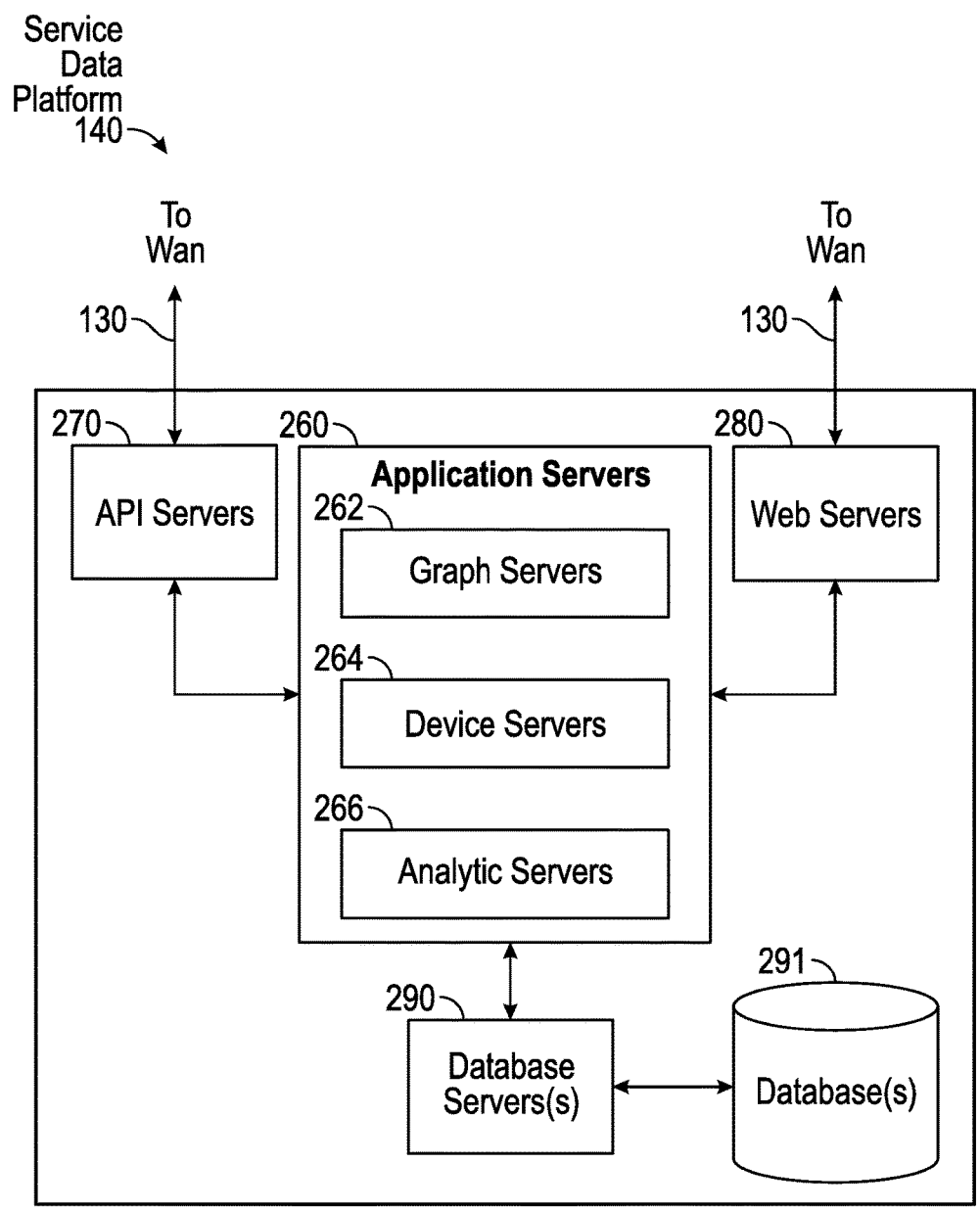
FIG. 2B illustrates a block diagram of a service data platform with multiple servers, according to example embodiments.

Referring to FIG. 2B, the processed sensor data is stored in databases 291 and accessed by database servers 290. In example embodiments, the application servers 260 communicate with other networked devices through the WAN 130 via an API server 270 or a Web Server 280.

In various embodiments, the owner of the lighting network 100 authorizes third parties to install and execute sensor applications 120 at the lighting nodes 105 within the lighting network 100. The sensor applications 100 utilize sensor data collected and processed at the lighting nodes 105 for use by authorized third parties. The results of the node-based processed sensor data is transmitted to the service data platform 140. The authorized third parties access the node-based processed sensor data through the service data platform 140, via a sensor data API in various embodiments. In various embodiments, the service data platform 140 is owned and operated by a service provider or other entity who manages various aspects of the lighting nodes 105, the data provided by the lighting nodes 105, and the deployment and execution of sensor applications 120 at the lighting nodes 105.

The service data platform 140 will be discussed in further detail below in conjunction with FIG. 2B, FIG. 5B, and FIGS. 6-8.

FIG. 2A illustrates a service end-point platform 210 that receives high bandwidth data (or large amount of data) from sensors and provides low bandwidth data that is capable of being transmitted over a network, according to example embodiments. As discussed above, the lighting nodes 105 may include multiple sensors 416, which are also referred to as sensor devices. Examples of sensors 416 include lighting sensors, audio sensors, camera sensors, video sensors, etc.

FIG. 2A illustrates sensor drivers 230 and 231 receiving sensor data from sensors and using the sensor data API 330 to provide the high bandwidth sensor data to the applications 220 and 221 according to an example embodiment. The sensor drivers 230 and 231 may be implemented as software in the service end-point platform 210 below the sensor data API 330. The sensor applications 220 and 221 produce results from the node-based processing of the sensor data. The results are transmitted, as low bandwidth data over paths 250 and 251 to the WAN 130. In various embodiments, the low bandwidth data may represent insights from the sensor data generated by the sensor applications 220 and 221 that use the high bandwidth data.

In various embodiments, the algorithms implemented by the sensor applications 220 and 221, represent analytics processing that may be performed at the lighting nodes 105. A camera may represent a sensor device capable of taking videos with audio and image data. Image data from the camera, may represent raw sensor data that represent high bandwidth data in the megabits or gigabits per second range. The image data from a camera is difficult to transmit over the network (e.g., WAN 130) if the image data is not compressed or otherwise reduced in size, suitable for efficient transmission. Although it is possible to compress the image data, such compression may result in loss of some of the image data details. Rather than transmitting raw image data, the sensor applications 220 or 221 may perform analytics on the raw image data and then send the results of the node-based processed raw image data to the network (e.g., WAN 130). The node-based processing of the raw image data may preserve nearly 100% of the details from the raw image data.

Another example of a sensor device that produces high bandwidth data is an accelerometer which measures vibrations. An accelerometer may measure the vibrations at a fast sample rate, for example, 100 samples per second. The raw sensor data may be too large or received at too fast a rate to transport it efficiently over a wireless network, in order to make insights into the raw sensor data. For example, desired insights from the raw sensor data may include peak acceleration or spectral content. The sensor applications 220 and 221 may perform node-based sensor processing to determine occasional peaks or snap shots, where the results of the node-based processing may be transported to the network (e.g., WAN 130).

Audio data from audio sensors may also provide high bandwidth sensor data. Audio analytics may include listening for someone to scream, glass breaking, cars crashing, gun shots, etc. The audio analytics determine when particular events occur. Rather than sending the audio recordings (representing high bandwidth data in some cases) over the network (e.g., WAN 130) for analytics processing to determine whether certain events have occurred, the sensor applications 220 or 221 may perform node-based sensor processing to detect the occurrences of certain events. The results from the node-based sensor processing are then transported to over the network (e.g., WAN 130) to the service data platform 140, for access by authorized users.

In the various high bandwidth data examples described above, the data analytics results (generated by the applications 220 or 221) are transported over the network to the cloud where the service data platform 140 resides. The service data platform 140 may represent centralized servers for the lighting sensor network 160. The results are then stored in the service data platform 140. The processed sensor data may be accessed by authorized users from the service data platform 140 using a web API or a programmatic API. The owner of the service data platform 140 may provide a web application for authorized users to access the processed sensor data. Some users may create their own applications and access the processed sensor data via other APIs.

FIG. 2B illustrates the service data platform 140, according to example embodiments. The service data platform 140 includes an API server 270 and a web server 280 that may be coupled to, and provide programmatic and web interfaces respectively to, one or more application server(s) 260. The service data platform 140 may be hosted on dedicated or shared server machines that are communicatively coupled to enable communications between server machines. Each of the servers may comprise one or more modules or applications and each of which may be embodied as hardware, software, firmware, or any combination thereof.

The application server(s) 260 are, in turn, shown to be coupled to one or more database server(s) 290 that facilitate access to one or more information storage repositories or database(s) 291. In an example embodiment, the database(s) 291 are storage devices that store sensor information and sensor analytics information. The application server(s) 260 include graph servers 262, device servers 264, and analytic servers 266. These servers will be discussed in further detail in conjunction with FIGS. 7-8.

Figure 4A:
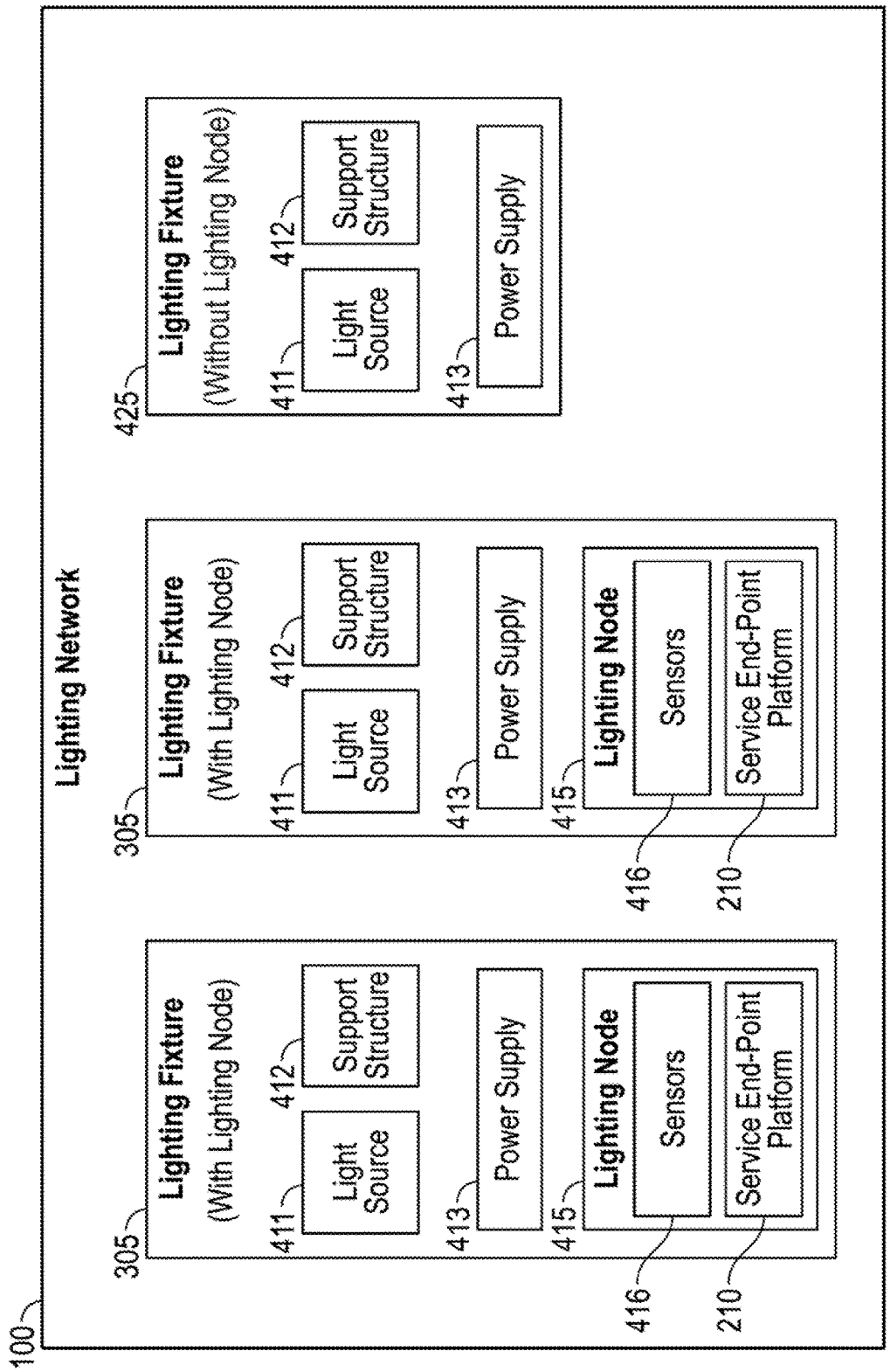
FIG. 4A illustrates a block diagram of a lighting network with multiple lighting fixtures, according to example embodiments.
Figure 4B:
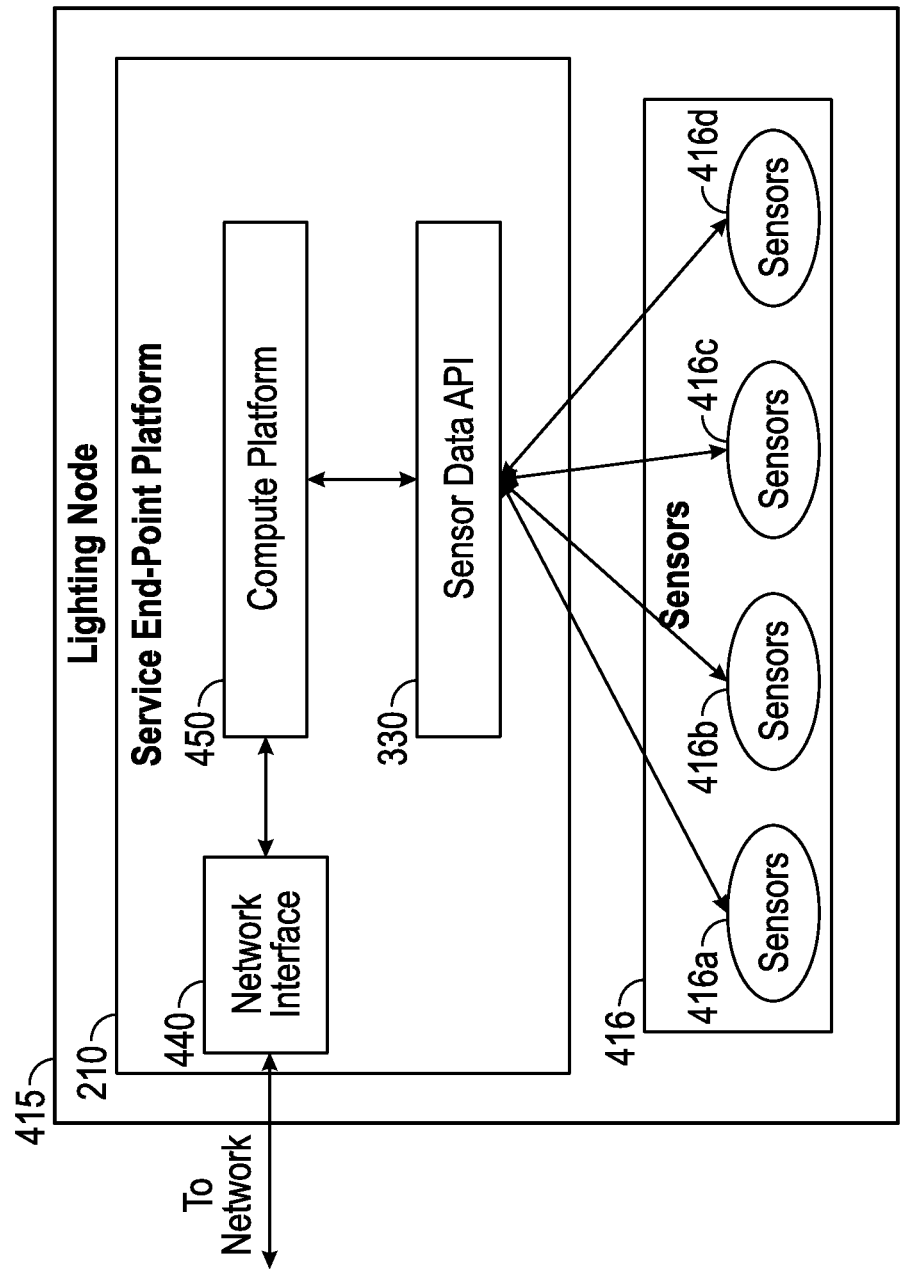
FIG. 4B illustrates a block diagram of a lighting node with a service end-point platform in communication with sensors, according to an example embodiment.
Figure 4C:
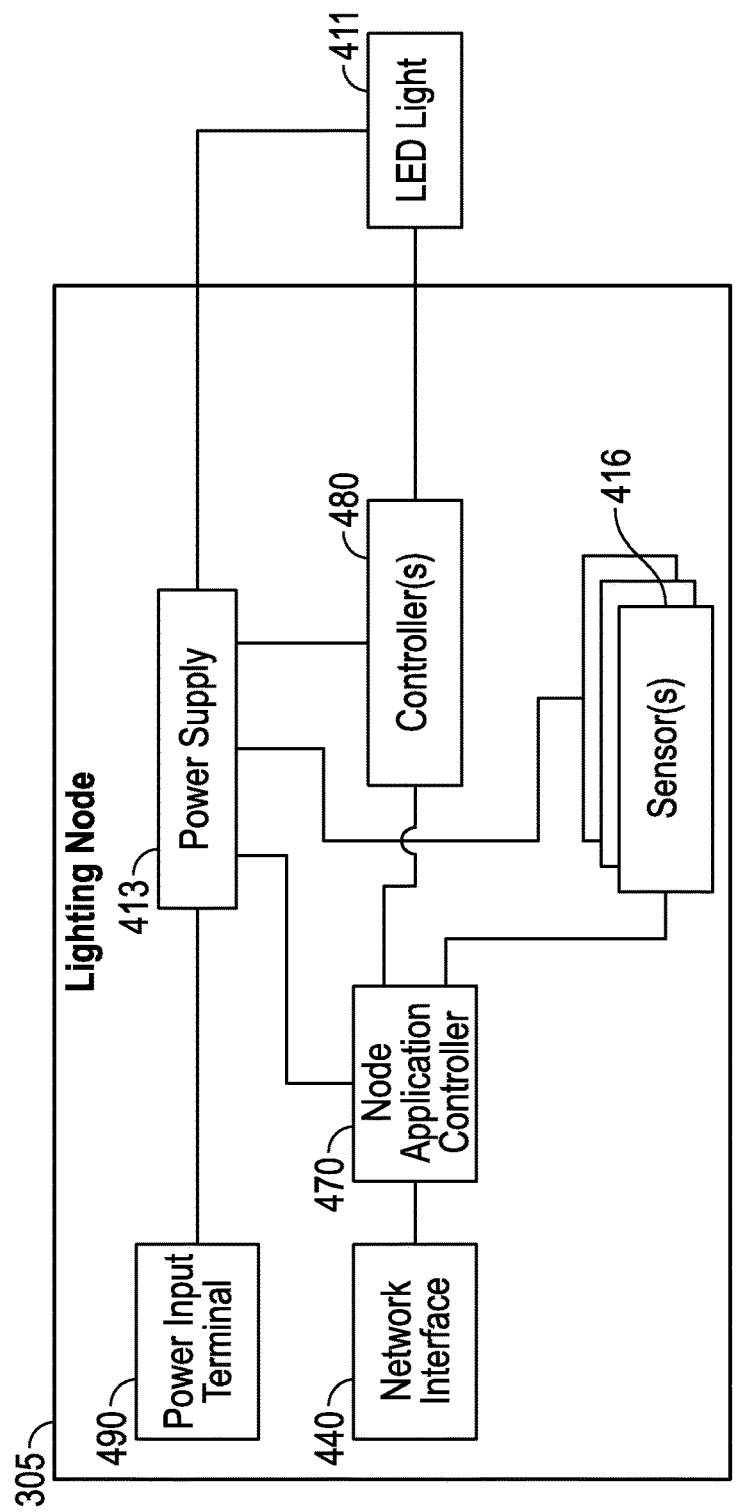
FIG. 4C illustrates a block diagram of a lighting node, according to an example embodiment.

FIG. 3A illustrates software components within an end-point application framework 310 implemented at the lighting node 105, according to example embodiments. FIGS. 4A-4C illustrate various hardware embodiments of the lighting nodes 105. In exemplary embodiments, the end-point application framework 310 manages the functionality for supporting the application scripting functionality or node-based processing of sensor data within the light sensor network 160.

FIG. 3A illustrates the various software components in the end-point application framework 310 layer of the lighting nodes 105, according to an example embodiment. Residing within the end-point application framework 310 is a container 320 for the sensor application 220, an administrative API 340, an application API 350 and a sensor data API 330. The container 320 for the sensor application 320 manages the sensor application 220. In various embodiments, the sensor application 220 is implemented using a scripting language. For example, the container 320 is used to start, stop, restart, download and reload scripts based on requests 366 via the administrative API 340 to the container 320. The administrative API 340 provides requests over path 365 from the service data platform 140. These requests may be referred to as admin or configuration requests. The service data platform 140 is responsible for deploying software applications to the lighting nodes 105. The sensor application 220 may be deployed by sending a file from the service data platform 140 to the sensor application 220 using the administrative API 340.

The sensor applications 220 provided by third parties may be received by the service data platform 140 using the application management API 142, and then downloaded or uploaded (using the administrative API 340) for node-based processing of sensor data and sensor events.

The end-point application framework 310 is also responsible for managing various interfaces, including the administrative API 340, the application API 350, and the sensor data API 330.

As discussed above, the administrative or configuration requests 366 are provided using the administrative API 340. The service data platform 140 manages the requests 366 and sends communications, including the requests 366, to the end-point application framework 310 over path 365.

The sensors provide raw sensor data 363 and sensor data events 364 to the sensor application 220 using the sensor data API 330. The sensor application 220 may provide a request 368 to the sensor data API to retrieve the raw sensor data 363 and sensor events 364. The raw sensor data 363 and the sensor events 364 are provided to the sensor application 220 via the response 369. The sensor application 220 may run analytics on the raw sensor data 363 and sensor data events 364 received via the sensor data API 330 to produce results of the node-based processed sensor data.

The results of the node-based processed sensor data is transmitted over path 367 via an application API 350 to the service data platform 140. Users may the access the results of the node-based processed sensor data using the aggregate data API 141.

FIG. 4A illustrates the lighting network 100, according to example embodiments. The lighting network 100 illustrates multiple lighting fixtures 305 and 425. The number of lighting fixtures in a lighting network 100 may vary, depending on the client's needs. Furthermore, not all lighting fixtures include a lighting node 415 directly or indirectly attached to it. For example, the lighting fixture 425 does not include a lighting node 415 attached to it. However, in some embodiments, the lighting fixture 425 may be in communication with a remote lighting node. In alternative embodiments, other types of fixtures may be used that provide a power source and networking capabilities to the lighting nodes 415. In yet further embodiments, the lighting nodes 415 may be referred to as sensor nodes or nodes.

The lighting fixtures 305 both include a light source 411, support structure 412, a power supply 413, and a lighting node 415. In some embodiments, the lighting nodes 415 may include local storage (not shown) for storing sensor data, including raw and processed sensor data. The lighting nodes 415 include a service end-point platform 210 and sensors 416 to provide sensor data for detecting various conditions and events.

FIG. 4B illustrates a service end-point platform 210 within a lighting node 415, according to an example embodiment. The service end-point platform 210 include a sensor data API 330 for receiving sensor data (raw sensor data and sensor data events), a compute platform 450 for processing the sensor data at the lighting node 415, and a network interface 440. The network interface 440 may be used to send the sensor data processed by the compute platform 450 to the service data platform 140 over the network (e.g., WAN 130).

In an example embodiment, the compute platform 450 is responsible for processing the sensor data at the lighting node 415. One or more hardware components shown in FIG. 4C (e.g., the node application controller 470), together with software represented by the end-point application framework 310 and the sensor applications 120, may be used to implement the compute platform 450 shown in FIG. 4B.

FIG. 4C shows an exemplary block diagram of an embodiment of a lighting node 415. In some embodiments the lighting node 415 may be controlled by a node application controller 470 that may consist of software running on a microcontroller (referred to as a node application controller 470) which is connected to volatile and non-volatile memory (not shown). In various embodiments, the sensor application 220 is installed on the memory in the node application controller 470 and executed by the node application controller 470. The node application controller 470 may provide functionality for executing the software applications 120. In another embodiment, the node application controller 470 may consist of firmware running on a field-programmable gate array (FPGA). The node application controller 470 may communicates over the LAN via a network interface 440 that is compatible with the chosen LAN network protocol. The node application controller 470 may read data from sensors 416 and may store the data in its memory (not shown), it may also forward the data over the LAN to the service data platform 140. The node application controller 470 may also send output signals to controllers 480 to change the settings of connected, controlled devices such as an LED light 411. The node application controller 470 may also be connected to a network interface 440 (e.g., an uplink transceiver that communicates with the service data platform 140 with a wireless uplink antenna). In various embodiments, the devices on the lighting node 305 may be powered by a power input terminal 490 that provides power to one or more power supplies 413 within the lighting node 305.

Figure 5A:
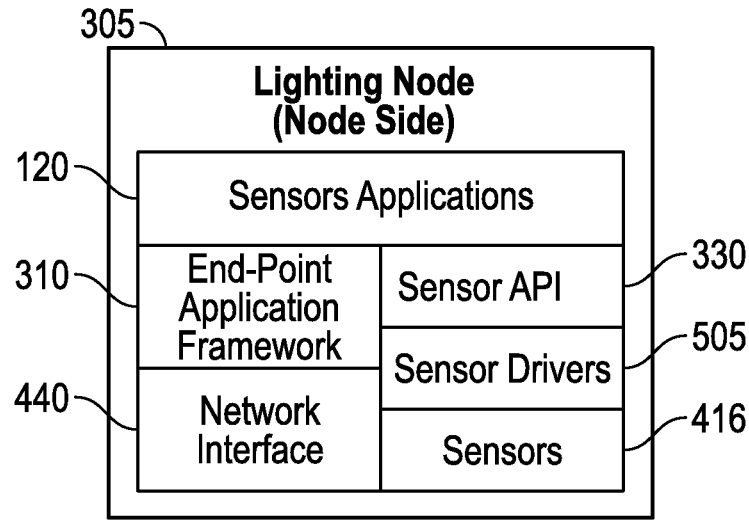
FIG. 5A illustrates a diagram of a lighting node having multiple components, according to an example embodiment.

FIG. 5A illustrates the lighting node 415 having multiple components, according to an example embodiment. The lighting node 415 includes the end-point application framework 310 that provides a framework for enabling the node-based processing of sensor data by the sensor applications 120. The end-point application framework 310 manages various functions managing the node-based processing of sensor data. As discussed above, the end-point application framework 310 manages the interfaces, for example with the interface between the sensors 416 and the sensor applications 120, and the interface between the lighting node 415 and the service data platform 140. The sensor drivers 505 provide the sensor data from the sensors 416 using the sensor data API 330 for processing by the sensor applications 120. The network interface 440 provides the interface between the lighting node 415 and the service data platform 140.

Figure 5B:
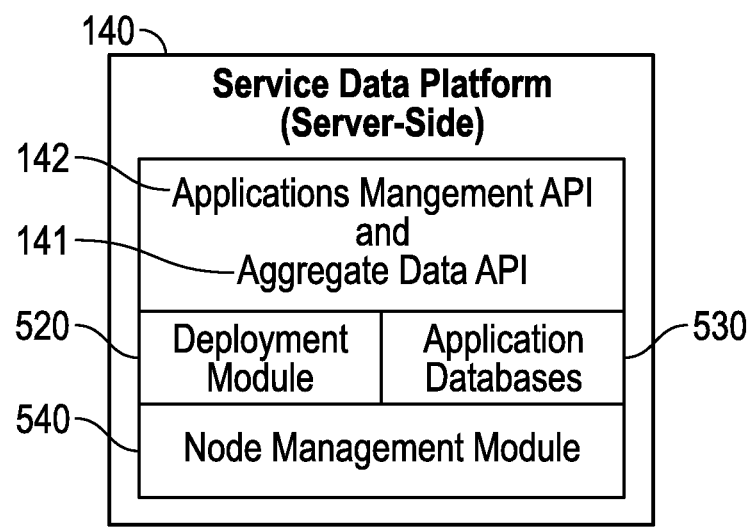
FIG. 5B illustrates a diagram of a service data platform having multiple components, according to an example embodiment.

FIG. 5B illustrates the service data platform 140 having multiple components, according to an example embodiment. The application management APIs 142 provide an interface for users, such as third parties, to upload the sensor applications 120 that they would like to deploy at the lighting nodes 415 within the lighting network 100. Once the sensor data is processed by the sensor applications 120 deployed at the lighting nodes 105, users may access results of the node-based processed sensor data from the service data platform 140 through the aggregate data APIs 141. The application databases 530 store the results of the processed sensor data. The application databases 530 may represent one or more of the databases 291 shown in FIG. 2B. Returning to FIG. 5B, the deployment module 520 may provide functionality to deploy the sensor applications 120 to one or more selected lighting nodes, or groups of lighting nodes. The deployment module 520 and the node management module 540 will be discussed in further detail below in conjunction with FIGS. 6-8.

Figure 5C:
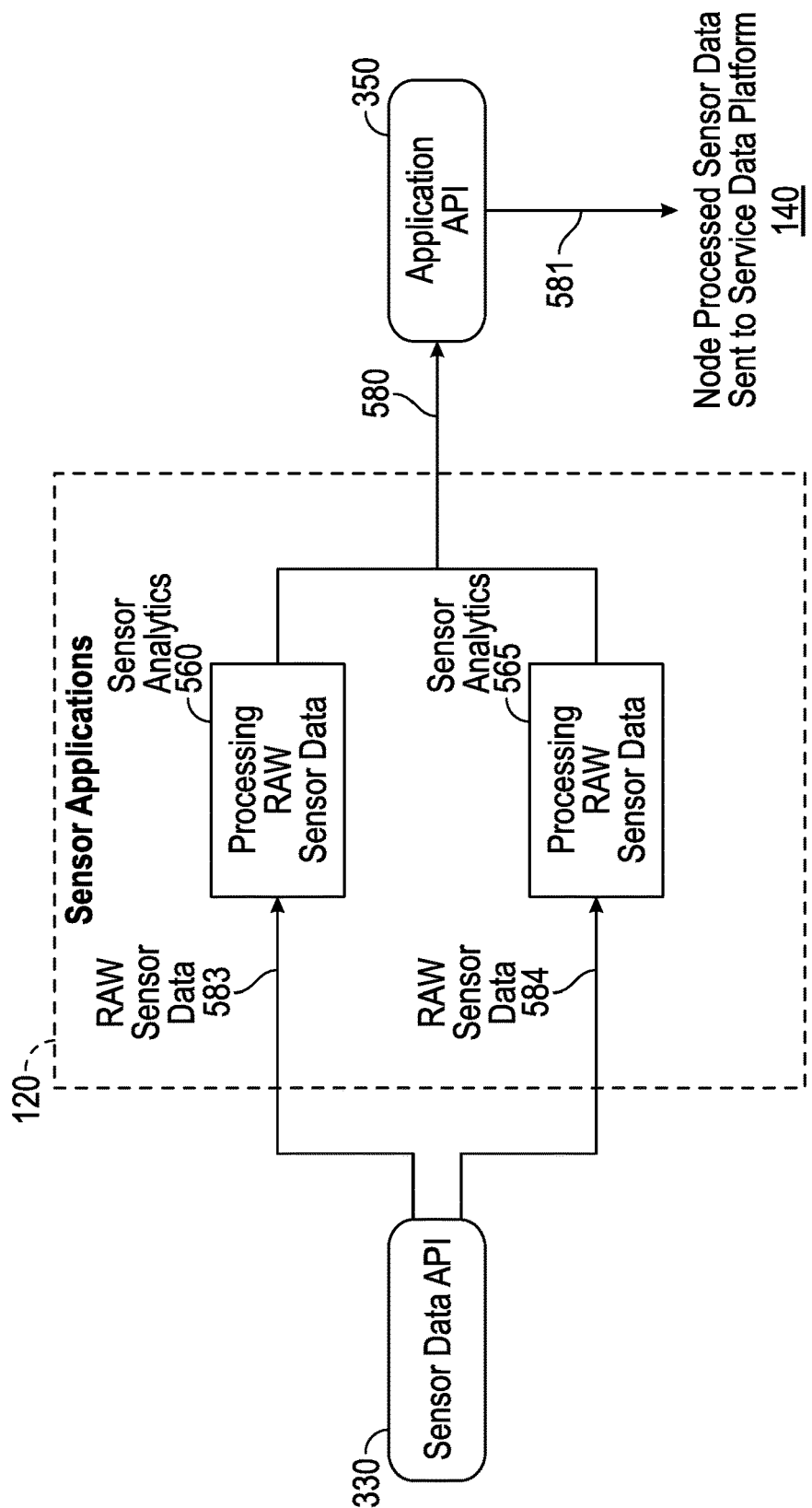
FIG. 5C is a diagram of an exemplary software application for processing of sensor data at lighting nodes, according to example embodiments.

FIG. 5C is a diagram of an exemplary sensor application that enables the end-point application framework 310 to manage the processing of sensor data at lighting nodes 105 within the lighting network 100. The sensor data API 330 and the application API 350 represent some of the components from the end-point application framework 310. The sensor applications 120 includes various software components.

According to FIG. 5C, the sensor applications 120 may be installed at two lighting nodes 105, referred to as the first lighting node and the second lighting node. The sensor data API 330 provides an interface for the sensor applications 120 to receive sensor data. The raw sensor data is sent (via path 583) to the sensor analytics 560 for performing analytics on the sensor data. The raw sensor data is sent (via path 584) to the sensor analytics 565 for performing analytics on the sensor data.

The sensor analytics 560 and 565 represents a software layer that is responsible for processing the raw sensor data and applying algorithms to locate, classify and correlate information to generate the results of the node-based processing of sensor data. In various examples, the sensor software, provided by third-party application developers, may represent rule sets for generating heuristics or other analyses of particular types of sensor data (e.g., motion detection data, ambient light sensor data, etc.) collected at various lighting nodes 105 within the lighting sensor network 160. Examples of sensor data processed by the sensor analytics 560 and 565 include: data from environmental sensors (e.g., temperature and humidity), gases (e.g., $CO_2$ and CO), data from accelerometers (e.g., vibrations), particulate, power, RF signals, ambient light, and motion detection, still images, video and audio. The information generated by the sensor analytics 560 and 565 is made available to the application API 350 over communication path 580 and further made available to the service data platform 140 over communication path 581.

The containers (not shown in FIG. 5C) manages the execution of the sensor applications, with a separate container for each software application.

Figure 6:
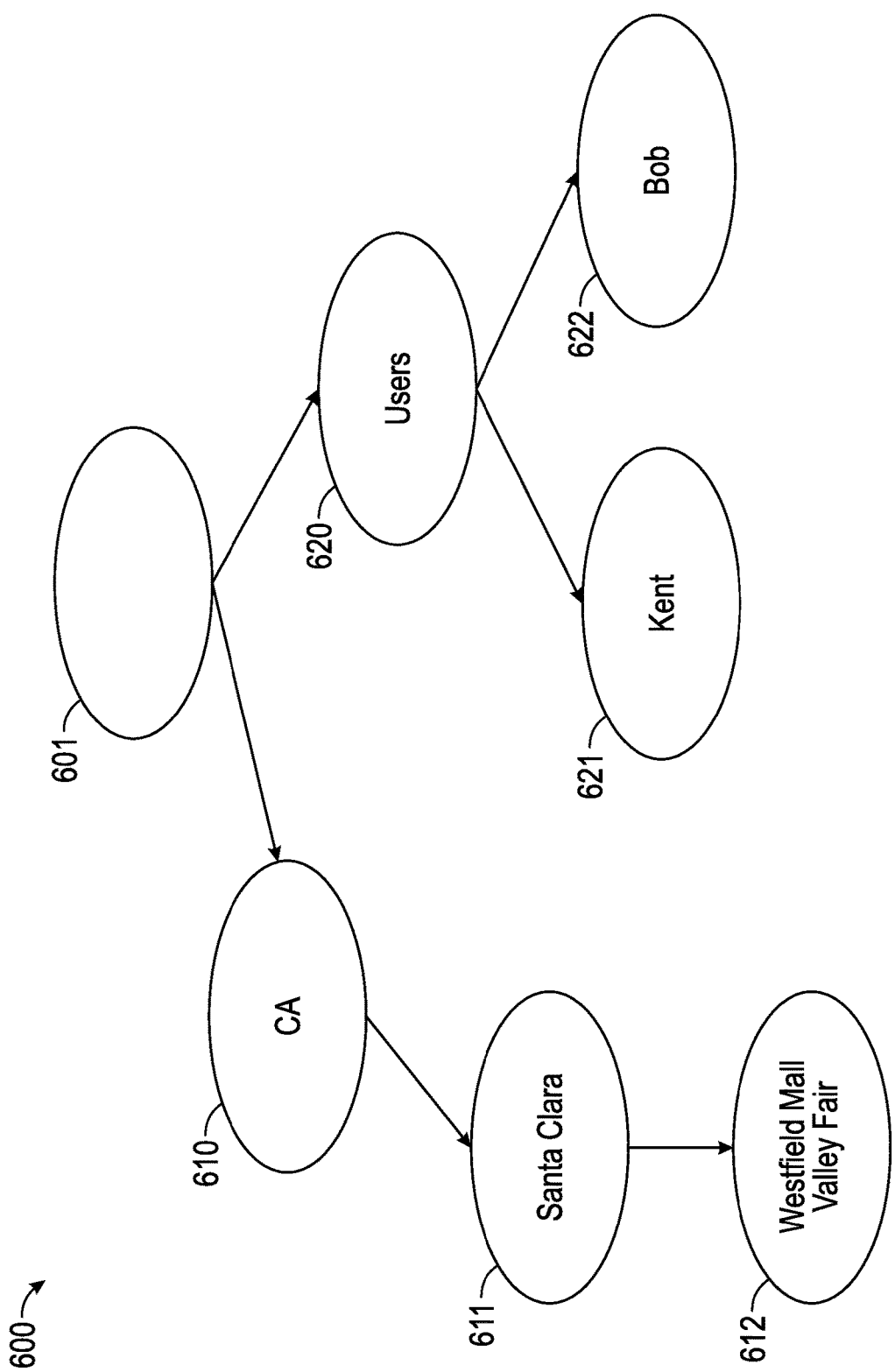
FIG. 6 illustrates an example of a tree used by the service data platform to organize and manage lighting nodes within a lighting network.

FIG. 6 illustrates an example of a tree used by the service data platform 140 to organize and manage lighting nodes within the lighting network 100. The tree 600 is a data structure that is generated and utilized by the service data platform 140 to manage the lighting nodes 105 in many lighting networks 100. The graph servers 262 may be used to manage groupings of nodes from a hierarchical tree structure such as tree 600. The nodes within the tree may be used to track information about lighting nodes 105 within lighting networks 100 by geographical location and user information, as well as other information. The tree is useful in tracking permissions to determine, for example, which lighting nodes 105 to deploy sensor applications 220.

The tree 600 includes a node 601, which represents a root node in the tree 600. The number and types of nodes in a tree may vary. The nodes 610, 611 and 612 represent nodes with location information. For example, the node 610 represents a state California (CA), the node 611 represents a city Santa Clara, and the node 612 represents the Westfield Mall Valley Fair. In one example, by selecting the node 612 through a user interface presented to a user (e.g., a system administrator of the service data platform 140) on a client device (not shown), the lighting network 100 including is associated lighting nodes 105 at the Westfield Mall at Valley Fair is selected. By selecting the node 612, the system administrator of the service data platform 140 may deploy a sensor application 220 to the lighting nodes 105 located at the lighting network 100 at Valley Fair.

The nodes 620, 621 and 622 represent user information. In one example, the node 620 may represent users authorized to request the system administrator of the service data platform 140 to deploy the sensor application 220 to the lighting nodes 105 at the lighting network 100 at Valley Fair. The nodes 621 and 622 represent specific users, Kent and Bob, respectively, from the group of authorized user.

In various embodiments, the tree 600, may be presented to a user as a graphical user interface to allow system administrators to view the lighting nodes 105 by geographical location, customers or owners of the Lighting nodes 105, tracking permissions (e.g., permissions granted to third parties to deploy sensor applications 220), and other information useful for managing many lighting networks 100 having multiple lighting nodes 105 at various customer sites across diverse geographic locations.

As indicated above, the service data platform 140 may deploy one or more sensor applications 220 to each lighting node 105, provided the administrator of the service data platform 140 is authorized by the owner of the lighting network 100 at a customer site. The third party application developer of a sensor application 220 may specify which devices (e.g., lighting nodes 105, service end-point platform 210, and end-point application framework 310, and components within these devices) which are compatible with the sensor application 220 that the third party application developer would like to deploy at lighting nodes 105. The system administrator of the service data platform 140 manages the deployment of the sensor applications 220 to the various nodes. The service data platform 140 allows the third party application developer (or other users) to upload the sensor applications 220 and to assign sensor application codes to the devices (e.g., lighting nodes 105) in the field. The service data platform 140 provides the ability for a user to group lighting nodes 105, for example, by using the tree 600 to assign one or more sensor applications 220 to the group of lighting nodes 105. The service data platform 140 further provides an ability for a user to push down the sensor applications 220 to the assigned lighting nodes 105. In various embodiments, the administrative API 340 (shown in FIG. 3A) is used by the service data platform 140 to upload the sensor applications 220. The lighting nodes 105 execute the sensor applications 220 once deployed by the service data platform 140.

Figure 7:
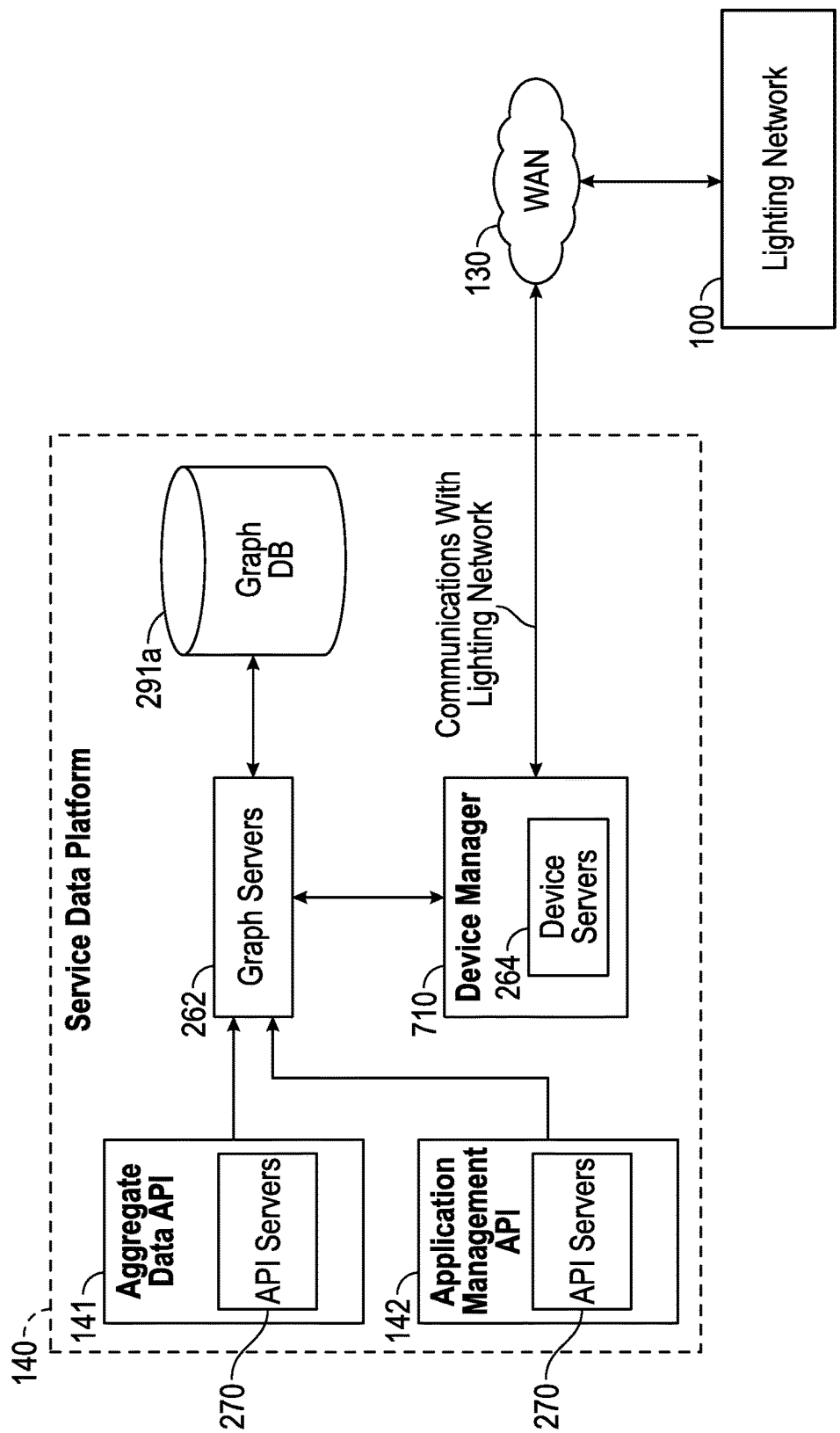
FIG. 7 illustrates a diagram of a service data platform in communication with users using application programming interfaces (APIs) and a lighting network, according to example embodiments.

FIG. 7 illustrates a block diagram of the service data platform 140 with various components, according to example embodiments. The service data platform 140 includes the aggregate data API 141 and the application management API 142, graph servers 262 coupled to a graph database 291a, and a device manager 710. In some embodiments, the graph database 291a represents one or more of the databases 291 shown in FIG. 2B.

In various embodiments, the aggregate data API 141 and the application management API 142 are implemented using the API servers 270. The APIs 141 and 142 provide external APIs to authorized users of the service data platform 140, either to access node-based processed sensor data or upload sensor applications 120 for deployment at the lighting nodes 105, respectively. The APIs 141 and 142 are communicatively coupled to the graph servers 262.

The graph servers 262 provide functionality to group lighting nodes 105 by geographical information and user information provided by the hierarchical tree structures, such as tree 600. The lighting nodes 105 within the lighting network 100 are managed by groups using the graph servers 262. In various embodiments, the sensor applications 220 are managed by groups, for example, during deployment of the sensor applications 220.

The device manager 710 provides functionality to manage the lighting nodes 105, which may be referred to as devices. The device manager 710 includes the device servers 264 and interfaces with the lighting nodes 105a-105c. The device manager 710 may communicate with the lighting network 100 through a network (e.g., WAN).

Figure 8:
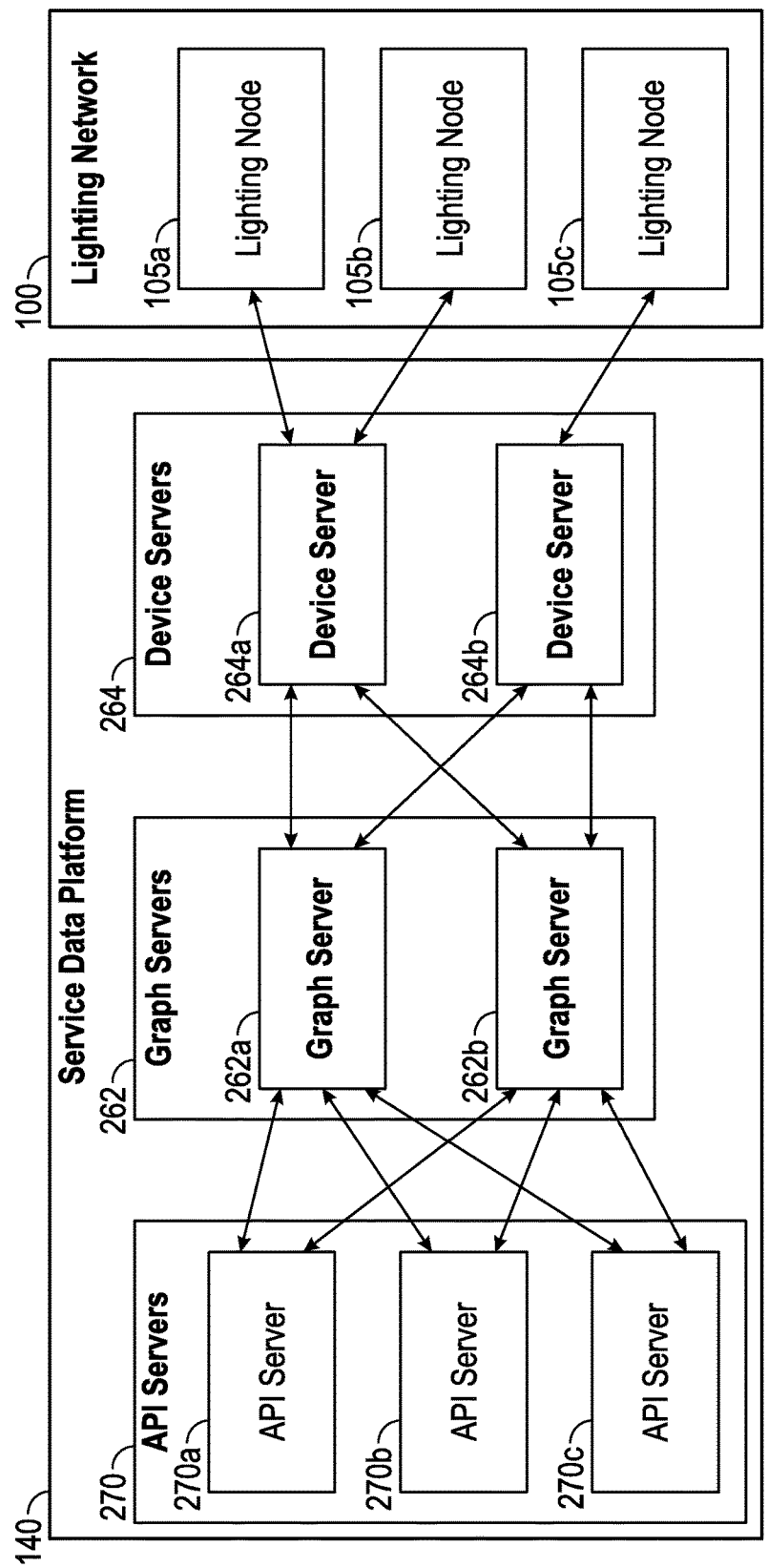
FIG. 8 illustrates a block diagram of a service data platform in communication with lighting nodes within a lighting network, according to example embodiments.

FIG. 8 illustrates a block diagram of the service data platform 140 with the various servers in communication with each other, according to example embodiments. The API servers 270 communicate with the graph servers 262, which communicate with the device servers 264. The device servers 264 communicate with the network (e.g., WAN 130 not shown). In the example shown in FIG. 8, the API servers 270a-270c each communicates with the graph servers 262a-262b. The graph servers 262a-262b each communicate with the device servers 264a-264b. The device servers 264a-264b communicate with the lighting nodes 105a-c.

Figure 9A:
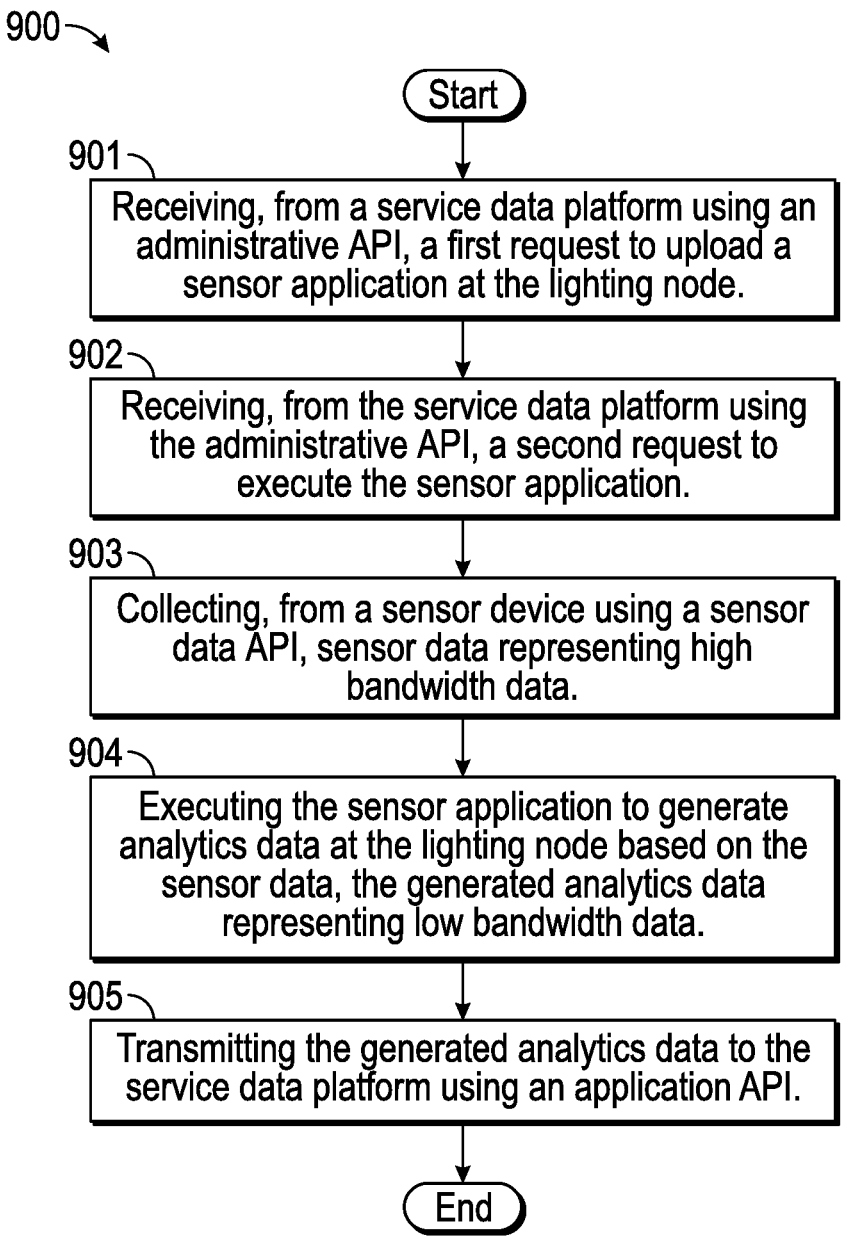
FIG. 9A is a flow diagram illustrating a method for processing sensor data at a lighting node within a network, according to example embodiments.
Figure 9B:
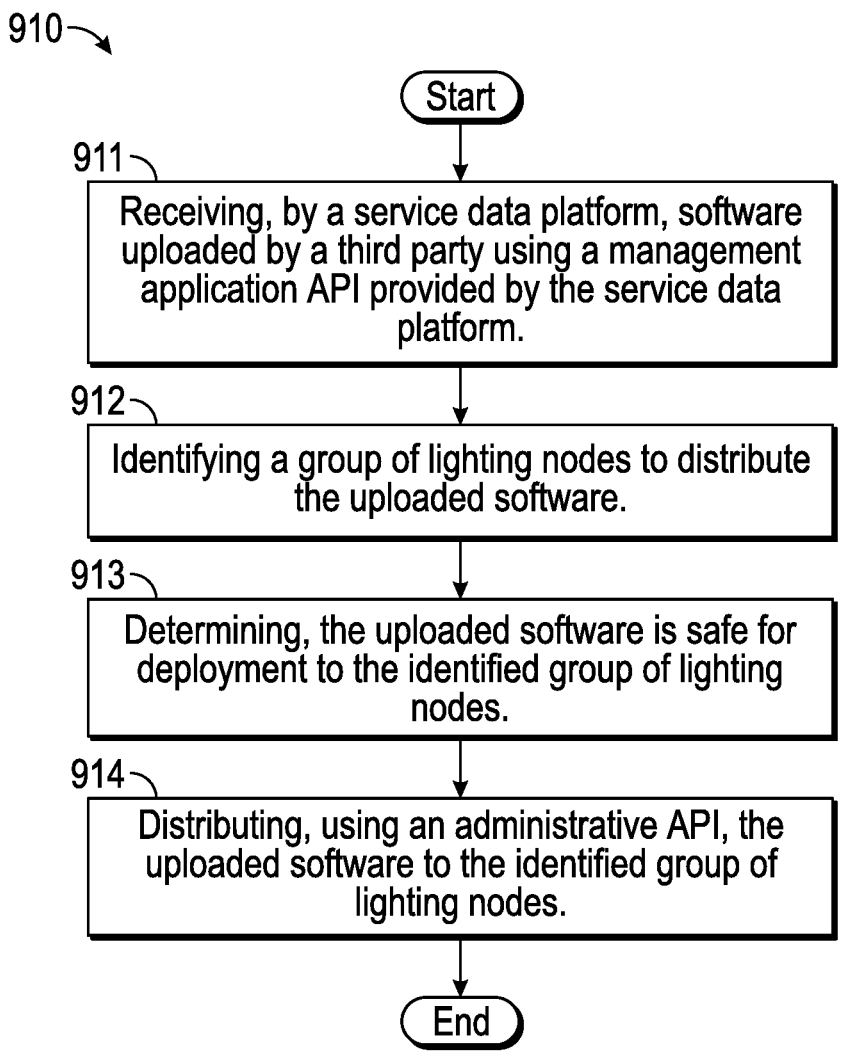
FIG. 9B is a flow diagram illustrating a method for deploying software to lighting nodes in a network, according to example embodiments.

FIGS. 9A-9B illustrates flow diagrams methods 900 and 910 implemented in various embodiments. In some embodiments, additional operations may be added to each of the methods 900 and 910, or one or more operations may be deleted from each of the methods 900 and 910. In further embodiments, the methods 900 and 910, or variants of these methods, may be combined. The operations performed in the methods 900 and 910, may be performed by one or more components or modules within lighting sensor network 160.

FIG. 9A describes a method 900 for processing sensor data at the lighting node 105 within a network (e.g., lighting network 100), according to example embodiments. The method 900 includes operations 901-905. At operation 901, receiving, from a service data platform 140 using an administrative API 340, a first request to upload a sensor application 220 at the lighting node 105. At operation 902, receiving, from the service data platform 140 using the administrative API 340, a second request to execute the sensor application 220. At operation 903, collecting, from a sensor device (e.g., 416) using a sensor data API 330, sensor data representing high bandwidth data. At operation 904 executing the sensor application 220 to generate analytics data at the lighting node 105 based on the sensor data, the generated analytics data representing low bandwidth data. At operation 905, transmitting the generated analytics data to the service data platform 140 using an application API 350.

In other example embodiments, the method 900 for processing sensor data at the lighting node 105 includes receiving, from the service data platform 140 using the administrative API 340, additional requests to perform administrative functions on the sensor application.

In example embodiments, the sensor data includes at least one of sensor raw data and sensor event data. In further embodiments, the sensor data represents the collected sensor data that has not been filtered, aggregated or otherwise changed by devices within the network. In some embodiments, the sensor application 220 represents a script. In another embodiment, the lighting node 105 represents a sensor node. In some embodiments, the sensor application 220 represents software developed by a third party to run on the lighting node 105 to perform node-based processing of unaltered sensor data collected at the lighting node 105.

In other embodiments, receiving, from the service data platform 140 using the administrative API 340, the first request to upload the sensor application 220 at the lighting node 105 includes receiving a file including the sensor application 220 and installing the sensor application 220 from the file onto the lighting node 105. In example embodiments, collecting the sensor data using the sensor data API 330 includes requesting, from the sensor device using the sensor data API 330, the sensor data receiving a response, from the sensor device (e.g., 416), including the sensor data requested. In other embodiments, collecting the sensor data using the sensor data API 330 includes collecting the sensor data at a data transfer rate such that the amount of the collected sensor data is too large to be efficiently transferred to the service data platform 140 near real time over a network (e.g., WAN 130). In another embodiment, collecting, from a sensor device using the sensor data API includes collecting the sensor data from the sensor device (e.g., 416) located at the lighting node or located at a remote lighting node.

In further embodiments, executing the sensor application 220 to generate analytics data at the lighting nodes 105 based on sensor data includes producing the analytics data based on unaltered sensor data at a data transfer rate such that the amount of the produced analytics data is capable of being transferred to the service data platform 140 near real time over a network (e.g., WAN 130). In various embodiments, executing the sensor application 220 to generate analytics data at the lighting node 105 based on the sensor data received at the lighting node 105 includes generating the analytics data based on unaltered sensor data to produce the low bandwidth data.

In various embodiments, executing the sensor application 220 to generate analytics data at the lighting node based on the sensor data includes executing the sensor application 220 within a container 320 to limit resources utilized by the sensor application 220 and to provide a secure operating environment for the sensor application 220. In example embodiments, executing the sensor application 220 to generate analytics data at the lighting node 105 based on the sensor data includes generating the analytics data by applying algorithms to locate, classify and correlate information. In another embodiment, executing the sensor application 220 to generate analytics data at the lighting node 105 based on the sensor data includes executing the sensor application 220 without affecting other software being executed at the lighting node 105. In yet another embodiment, executing the sensor application 220 to generate analytics data at the lighting node 105 based on the sensor data further includes generating the analytics data without affecting a normal operation of the lighting node 105.

FIG. 9B describes a method 910 of deploying software to lighting nodes 105 in a network (e.g., lighting sensor network 160), according to example embodiments. The method 910 includes operations 911-914. At operation 911, receiving, by a service data platform 140, software uploaded by a third party using a management application API 142 provided by the service data platform 140. At operation 912, identifying a group of lighting nodes 105 to distribute the uploaded software. At operation 913, determining, the uploaded software is safe for deployment to the identified group of lighting nodes 105. At operation 914, distributing, using an administrative API 340, the uploaded software to the identified group of lighting nodes 105.

In various embodiments, the method 910 of deploying software to lighting nodes 105 includes managing, using the administrative API 340, the execution of the software installed on the identified group of lighting nodes 105 by providing requests for administrative functions.

In other embodiments, the method 910 of deploying software to lighting nodes 105 includes receiving, from the identified group of lighting nodes 105 using an application API 350, node-processed sensor data produced by the identified group of lighting nodes 105; and storing the node-processed sensor data from the identified group of lighting nodes 105 in a database (e.g., 291) located at the service data platform 140. In yet another embodiment, the method of deploying software to lighting nodes 105 includes providing access to the stored node-processed sensor data requested by an authorized third party using an aggregate data API 141. In some embodiments, the software represents a sensor application 220. In further embodiments, the sensor application 220 is written in a scripting language.

Figure 10:
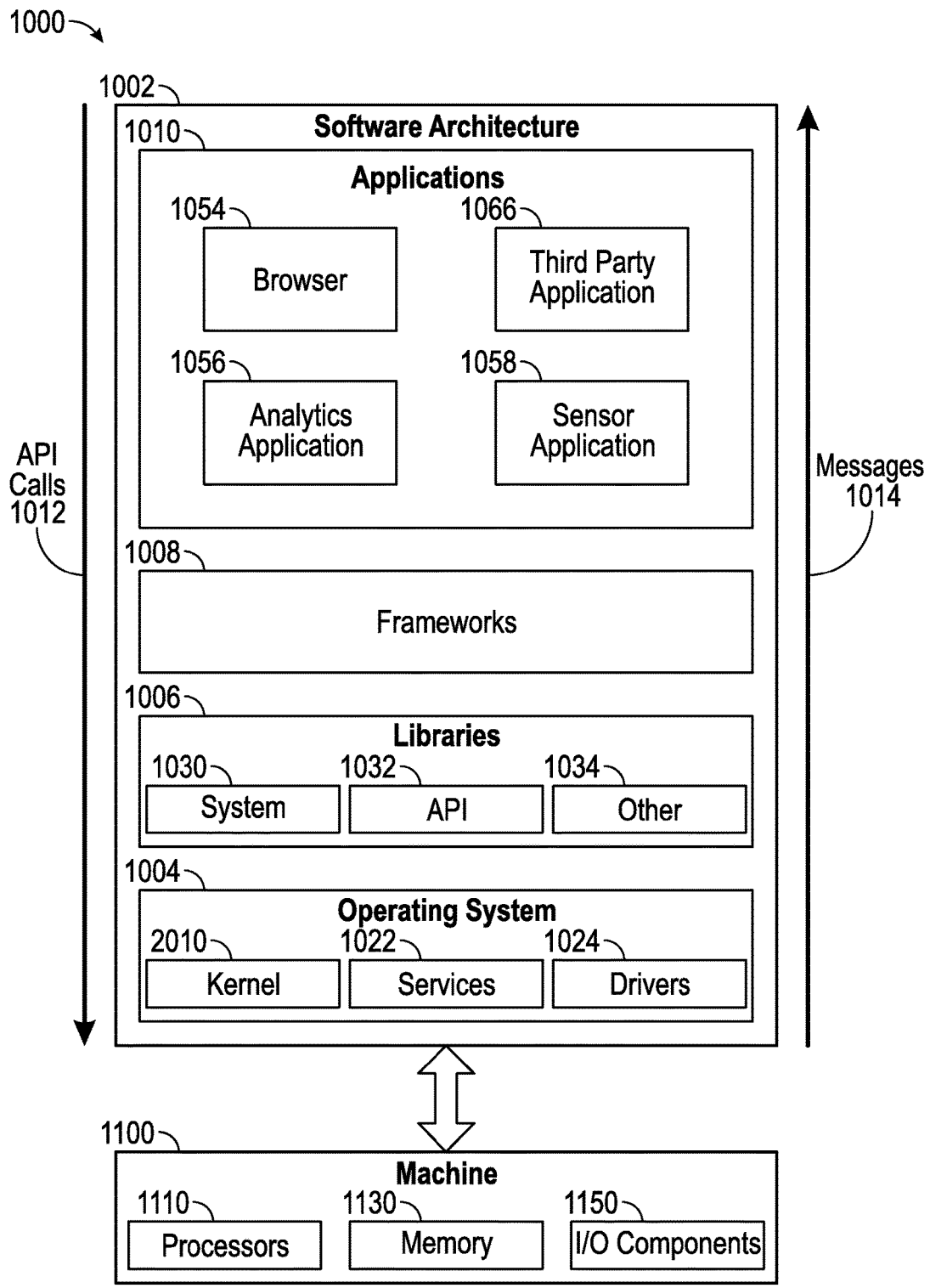
FIG. 10 is a block diagram illustrating an example of a software architecture that may be installed on a machine, according to some example embodiments.

FIG. 10 is a block diagram 1000 illustrating an architecture of software 1002, which may be installed on any one or more of devices described above. FIG. 10 is merely a non-limiting example of a software architecture, and it will be appreciated that many other architectures may be implemented to facilitate the functionality described herein. The software 1002 may be executing on hardware such as machine 1100 of FIG. 11 that includes processors 1110, memory 1130, and I/O components 1150. In the example architecture of FIG. 10, the software 1002 may be conceptualized as a stack of layers where each layer may provide particular functionality. For example, the software 1002 may include layers such as an operating system 1004, libraries 1006, frameworks 1008, and applications 1010. Operationally, the applications 1010 may invoke application programming interface (API) calls 1012 through the software stack and receive messages 1014 in response to the API calls 1012.

The operating system 1004 may manage hardware resources and provide common services. The operating system 1004 may include, for example, a kernel 1020, services 1022, and drivers 1024. The kernel 1020 may act as an abstraction layer between the hardware and the other software layers. For example, the kernel 1020 may be responsible for memory management, processor management (e.g., scheduling), component management, networking, security settings, and so on. The services 1022 may provide other common services for the other software layers. The drivers 1024 may be responsible for controlling or interfacing with the underlying hardware. For instance, the drivers 1024 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth.

The libraries 1006 may provide a low-level common infrastructure that may be utilized by the applications 1010. The libraries 1006 may include system 1030 libraries (e.g., C standard library) that may provide functions such as memory allocation functions, string manipulation functions, mathematic functions, and the like. In addition, the libraries 1006 may include API libraries 1032 such as media libraries (e.g., libraries to support presentation and manipulation of various media formats such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1006 may also include a wide variety of other libraries 1034 to provide many other APIs to the applications 1010.

The frameworks 1008 may provide a high-level common infrastructure that may be utilized by the applications 1010. For example, the frameworks 1008 may provide various graphic user interface (GUI) functions, high-level resource management, high-level location services, and so forth. The frameworks 1008 may provide a broad spectrum of other APIs that may be utilized by the applications 1010, some of which may be specific to a particular operating system or platform.

Figure 11:
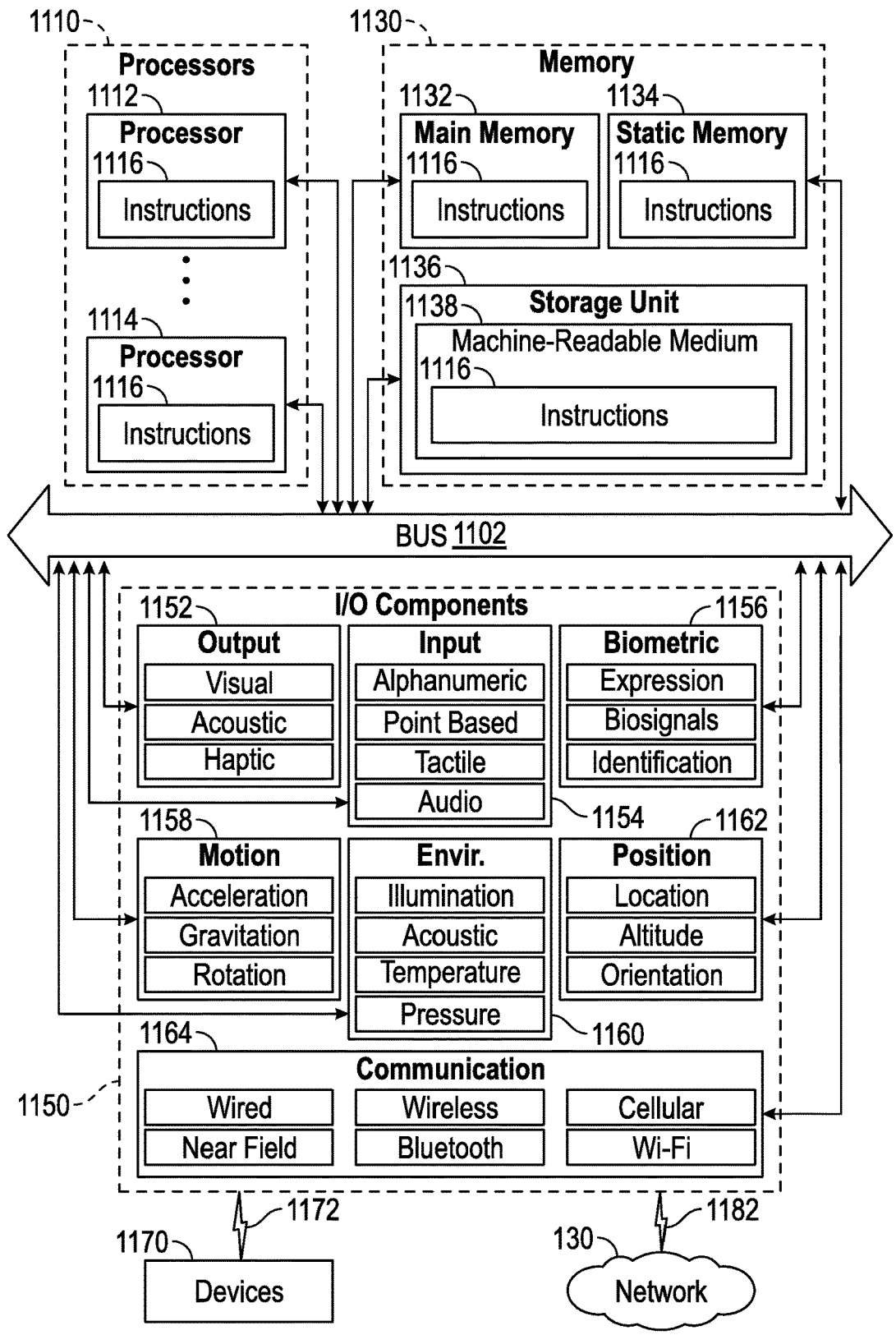
FIG. 11 illustrates a diagrammatic representation of a machine in the form of a computer system within which a set of instructions may be executed for causing the machine to perform any one or more of the methodologies discussed herein, according to an example embodiment.

The applications 1010 include a browser application 1054, a analytics application 1056, a sensor application 1058, and a broad assortment of other applications such as third party application 1066. FIG. 11 is a block diagram illustrating components of a machine 1100, according to some example embodiments, able to read instructions from a machine-readable medium (e.g., a machine-readable storage medium) and perform any one or more of the methodologies discussed herein. Specifically, FIG. 11 shows a diagrammatic representation of the machine 1100 in the example form of a computer system, within which instructions 1116 (e.g., software, a program, an application, an applet, an app, or other executable code) for causing the machine 1100 to perform any one or more of the methodologies discussed herein may be executed. In alternative embodiments, the machine 1100 operates as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1116, sequentially or otherwise, that specify actions to be taken by machine 1100. Further, while only a single machine 1100 is illustrated, the term "machine" shall also be taken to include a collection of machines 1100 that individually or jointly execute the instructions 1116 to perform any one or more of the methodologies discussed herein.

The machine 1100 may include processors 1110, memory 1130, and I/O components 1150, which may be configured to communicate with each other via a bus 1102. In an example embodiment, the processors 1110 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 1112 and processor 1114 that may execute instructions 1116. The term "processor" is intended to include multi-core processors that may comprise two or more independent processors (also referred to as "cores") that may execute instructions contemporaneously. Although FIG. 11 shows multiple processors, the machine 1100 may include a single processor with a single core, a single processor with multiple cores (e.g., a multi-core process), multiple processors with a single core, multiple processors with multiples cores, or any combination thereof.

The memory 1130 may include a main memory 1132, a static memory 1134, and a storage unit 1136 accessible to the processors 1110 via the bus 1102. The storage unit 1136 may include a machine-readable medium 1138 on which is stored the instructions 1116 embodying any one or more of the methodologies or functions described herein. The instructions 1116 may also reside, completely or at least partially, within the main memory 1132, within the static memory 1134, within at least one of the processors 1110 (e.g., within the processor's cache memory), or any suitable combination thereof, during execution thereof by the machine 1100. Accordingly, the main memory 1132, static memory 1134, and the processors 1110 may be considered as machine-readable media 1138.

As used herein, the term "memory" refers to a machine-readable medium 1138 able to store data temporarily or permanently and may be taken to include, but not be limited to, random-access memory (RAM), read-only memory (ROM), buffer memory, flash memory, and cache memory. While the machine-readable medium 1138 is shown in an example embodiment to be a single medium, the term "machine-readable medium" should be taken to include a single medium or multiple media (e.g., a centralized or distributed database, or associated caches and servers) able to store instructions 1116. The term "machine-readable medium" shall also be taken to include any medium, or combination of multiple media, that is capable of storing instructions (e.g., instructions 1116) for execution by a machine (e.g., machine 1100), such that the instructions, when executed by one or more processors of the machine 1100 (e.g., processors 1110), cause the machine 1100 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., Erasable Programmable Read-Only Memory (EPROM)), or any suitable combination thereof. The term "machine-readable medium" specifically excludes non-statutory signals per se.

The I/O components 1150 may include a wide variety of components to receive input, provide output, produce output, transmit information, exchange information, capture measurements, and so on. It will be appreciated that the I/O components 1150 may include many other components that are not shown in FIG. 11. The I/O components 1150 are grouped according to functionality merely for simplifying the following discussion and the grouping is in no way limiting. In various example embodiments, the I/O components 1150 may include output components 1152 and input components 1154. The output components 1152 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1154 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and force of touches or touch gestures, or other tactile input components), audio input components (e.g., a microphone), and the like.

In further example embodiments, the I/O components 1150 may include biometric components 1156, motion components 1158, environmental components 1160, or position components 1162 among a wide array of other components. For example, the biometric components 1156 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1158 may include acceleration sensor components (e.g., accelerometer), gravitation sensor components, rotation sensor components (e.g., gyroscope), and so forth. The environmental components 1160 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1162 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1150 may include communication components 1164 operable to couple the machine 1100 to a network 130 or devices 1170 via coupling 1182 and coupling 1172, respectively. For example, the communication components 1164 may include a network interface component or other suitable device to interface with the network 130. In further examples, communication components 1164 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1170 may be another machine or any of a wide variety of peripheral devices (e.g., a peripheral device coupled via a Universal Serial Bus (USB)).

Moreover, the communication components 1164 may detect identifiers or include components operable to detect identifiers. For example, the communication components 1164 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals).

In addition, a variety of information may be derived via the communication components 1164, such as, location via Internet Protocol (IP) geo-location, location via Wi-Fi® signal triangulation, location via detecting a NFC beacon signal that may indicate a particular location, and so forth.

In various example embodiments, one or more portions of the network 130 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 130 or a portion of the network 130 may include a wireless or cellular network and the coupling 1182 may be a Code Division Multiple Access (CDMA) connection, a Global System for Mobile communications (GSM) connection, or other type of cellular or wireless coupling. In this example, the coupling 1182 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 1116 may be transmitted or received over the network 130 using a transmission medium via a network interface device (e.g., a network interface component included in the communication components 1164) and utilizing any one of a number of well-known transfer protocols (e.g., hypertext transfer protocol (HTTP)). Similarly, the instructions 1116 may be transmitted or received using a transmission medium via the coupling 1172 (e.g., a peer-to-peer coupling) to devices 1170. The term "transmission medium" shall be taken to include any intangible medium that is capable of storing, encoding, or carrying instructions 1116 for execution by the machine 1100, and includes digital or analog communications signals or other intangible medium to facilitate communication of such software.

Furthermore, the machine-readable medium 1138 is non-transitory (in other words, not having any transitory signals) in that it does not embody a propagating signal. However, labeling the machine-readable medium 1138 as "non-transitory" should not be construed to mean that the medium is incapable of movement; the medium should be considered as being transportable from one physical location to another. Additionally, since the machine-readable medium 1138 is tangible, the medium may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed:

1. A method comprising:
receiving, by one or more processors of a machine, a first request to deploy a first sensor application to a first group of lighting fixtures that each include a corresponding sensor generating sensor data and a corresponding service end-point platform;
receiving, by one or more processors of the machine, a second request to deploy a second sensor application to a second group of lighting fixtures that each include a corresponding sensor and a corresponding service end-point platform, the first and second groups of lighting fixtures sharing in common a first lighting fixture with a first sensor and a first service end-point platform;
loading, by one or more processors of the machine, the first and second sensor applications onto the first service end-point platform of the first lighting fixture in response to the first and second requests, and providing access by the first and second sensor applications to at least one level of the sensor data to generate customized results based on the sensor data;
causing the first service end-point platform of the first lighting fixture to execute the first sensor application in a first container environment and execute the second sensor application in a second container environment, the first container environment being different from the second container environment, execution of the first sensor application generating first analytical results based on raw data from the first sensor, execution of the second sensor application generating second analytical results based on the raw data from the first sensor, each container managing a resource for running its associated sensor application having access to the at least one level of the sensor data; and
transmitting the generated first analytical results to a first submitter of the first request and the generated second analytical results to a second submitter of the second request.

2. The method of claim 1, further comprising receiving the first sensor application from the first submitter prior to the loading of the first sensor application onto the first service end-point platform.

3. The method of claim 1, further comprising performing a malware scan on the first sensor application prior to the loading of the first sensor application onto the first service end-point platform.

4. The method of claim 1, wherein the first or second sensor application includes a script.

5. The method of claim 1, wherein:
the first request to deploy the first sensor application to the first group of lighting fixtures is received via an application programming interface (API); and
the generated first analytical results are transmitted to the first submitter of the first request via the API.

6. The method of claim 1, wherein:
the second request to deploy the second sensor application to the second group of lighting fixtures is received via a web server; and
the generated second analytical results are transmitted to the second submitter of the second request via the web server.

7. The method of claim 1, wherein:
the first sensor application executes exclusively in the first container environment;
the second sensor application executes exclusively in the second container environment; and
the execution of the first sensor application generates the first analytical results in the first container environment with no influence on the execution of the second sensor application in generating the second analytical results in the second container environment.

8. The method of claim 1, wherein:
the first sensor application executes exclusively in the first container environment;
the second sensor application executes exclusively in the second container environment; and
the execution of the first sensor application generates the first analytical results in the first container environment with no access to the execution of the second sensor application in generating the second analytical results in the second container environment.

9. A system comprising:
a sensor device; and
an end-point application framework, implemented by one or more processors, that are configured to perform operations comprising:
receiving a first request to deploy a first sensor application to a first group of lighting fixtures that each include a corresponding sensor generating sensor data and a corresponding service end-point platform;

receiving a second request to deploy a second sensor application to a second group of lighting fixtures that each include a corresponding sensor and a corresponding service end-point platform, the first and second groups of lighting fixtures sharing in common a first lighting fixture with a first sensor and the first service end-point platform;

loading the first and second sensor applications onto the first service end-point platform of the first lighting fixture in response to the first and second requests, and providing access by the first and second sensor applications to at least one level of the sensor data to generate customized results based on the sensor data;

causing the first service end-point platform of the first lighting fixture to execute the first sensor application in a first sandbox environment and execute the second sensor application in a second sandbox environment, the first sandbox environment being different from the second sandbox environment, execution of the first sensor application generating first analytical results based on raw data from the first sensor, execution of the second sensor application generating a second analytical results based on the raw data from the first sensor, each container managing a resource for running its associated sensor application having access to the at least one level of the sensor data; and transmitting the generated first analytical results to a first submitter of the first requester and to generate a second analytical results to a second submitter of the second request.

10. A non-transitory machine-readable medium storing instructions that, when executed by one or more processors of the machine, cause the machine to perform operations comprising:

receiving a first request to deploy a first sensor application to a first group of lighting fixtures that each include a corresponding sensor generating sensor data and a corresponding service end-point platform;

receiving a second request to deploy a second sensor application to a second group of lighting fixtures that each include a corresponding sensor and a corresponding service end-point platform, the first and second groups of lighting fixtures sharing in common a first lighting fixture with a first sensor and the first service end-point platform;

loading the first and second sensor applications onto the first service end-point platform of the first lighting fixture in response to the first and second requests, and providing access by the first and second sensor applications to at least one level of the sensor data to generate customized results based on the sensor data;

causing the first service end-point platform of the first lighting fixture to execute the first sensor application in a first sandbox environment and execute the second sensor application in a second sandbox environment, the first sandbox environment being different from the second sandbox environment, execution of the first sensor application generating first analytical results based on raw data from the first sensor, execution of the second sensor application generating a second analytical results based on the raw data from the first sensor, each container managing a resource for running its associated sensor application having access to the at least one level of the sensor data; and transmitting the generated first analytical results to a first submitter of the first requester and to generate a second analytical results to a second submitter of the second request.

* * * * *